(12) United States Patent
Lowe

(10) Patent No.: US 7,815,215 B1
(45) Date of Patent: Oct. 19, 2010

(54) MULTIPURPOSE WORK SITE UTILITY CARRIER

(76) Inventor: Archie Lowe, 6812 S. Congress Ave., Austin, TX (US) 78745

( * ) Notice: Subject to any disclaimer, the term of this patent is extended or adjusted under 35 U.S.C. 154(b) by 519 days.

(21) Appl. No.: 11/900,777

(22) Filed: Sep. 14, 2007

Related U.S. Application Data

(63) Continuation-in-part of application No. 11/097,908, filed on Apr. 4, 2005, now Pat. No. 7,306,245.

(51) Int. Cl.
*B62B 1/00* (2006.01)
*B62B 3/02* (2006.01)

(52) U.S. Cl. ............ 280/639; 280/47.18; 280/47.19; 280/47.34; 280/47.24; 280/47.35

(58) Field of Classification Search ............ 280/47.34, 280/47.18, 47.19, 47.24, 47.35, 79.11, 79.3, 280/35, 639, 37, 38, 39, 643, 47.131, 47.17
See application file for complete search history.

(56) References Cited

U.S. PATENT DOCUMENTS

| | | | | |
|---|---|---|---|---|
| 2,484,677 A | * | 10/1949 | Binz | 280/38 |
| 3,266,813 A | * | 8/1966 | Bosko et al. | 280/8 |
| 4,720,048 A | * | 1/1988 | Maroney et al. | 280/47.34 |
| 4,984,704 A | * | 1/1991 | O'Malley | 220/23.4 |
| 6,152,462 A | * | 11/2000 | Barrett | 280/30 |
| 6,328,331 B1 | * | 12/2001 | McEnteggart | 280/653 |
| 6,341,788 B1 | * | 1/2002 | Ciccone | 280/47.28 |
| 6,948,724 B2 | * | 9/2005 | Davis | 280/30 |
| 7,255,355 B2 | * | 8/2007 | Chisholm et al. | 280/30 |
| 7,434,819 B1 | * | 10/2008 | Dunavin | 280/47.35 |
| 2005/0212236 A1 | * | 9/2005 | Tiramani et al. | 280/47.18 |
| 2005/0242534 A1 | * | 11/2005 | Woods et al. | 280/47.34 |

* cited by examiner

*Primary Examiner*—Hau V Phan
*Assistant Examiner*—John R Olszewski
(74) *Attorney, Agent, or Firm*—Charles E. Graves

(57) ABSTRACT

This disclosure describes a work site utility carrier that configures as a dolly or hand truck in its retracted mode and a work bench in its elevated mode. Pivoting arm pairs enable the carrier's lower and upper receptacles to be transitioned between modes. Two "wheelbarrow" handles are pivotally attached at the lower outer end of the upper receptacle. When oriented at right angles to the upper receptacle bottom, the handles lessen the effort needed to maneuver the carrier. In a "semi-inclined" position the carrier rests in part on the handle outer ends, with much of the mass of the upper receptacle already elevated. Full elevation is facilitated by moving the lower receptacle toward the handle outer ends which act as brakes to keep the carrier stationary during the elevation.

18 Claims, 21 Drawing Sheets

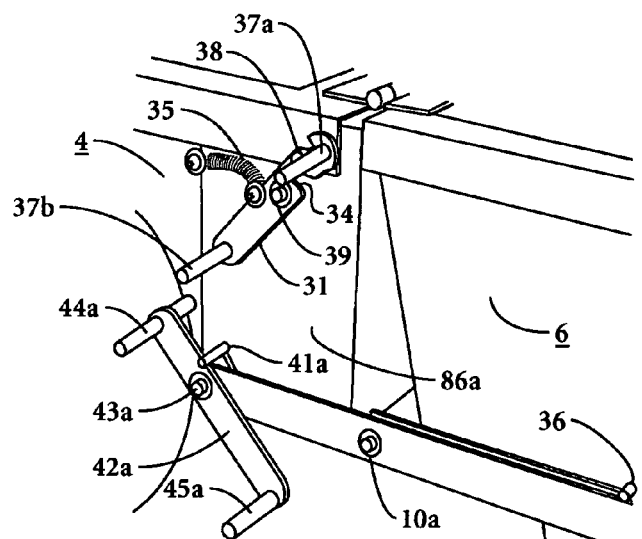
*FIG 7*
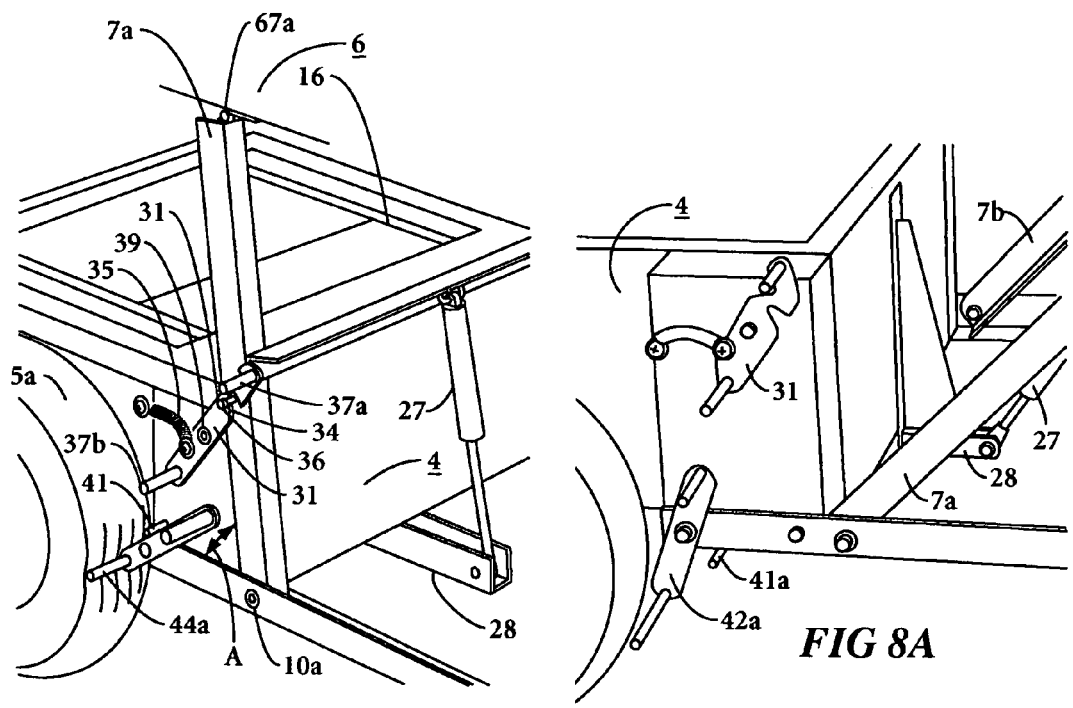
*FIG 8*
*FIG 8A*

MULTIPURPOSE WORK SITE UTILITY CARRIER

This application is a continuation-in-part application of earlier non-provisional U.S. application Ser. No. 11/097,908, filed on Apr. 4, 2005 now U.S. Pat. No. 7,306,245.

TECHNICAL FIELD

This invention relates to work site utility carriers that serve multiple materials handling purposes for craftsman and tradesmen on-the-job. In particular, the invention relates to a unitary self-contained carrier that serves as a hand truck, a dolly, a toolbox and a workbench.

BACKGROUND OF THE INVENTION

The work routines of many tradesmen today require that tools and materials be brought to the job and moved around the job location; and that some work be performed on a workbench. For work such as heavy maintenance, plumbing or carpentry the tools are heavy and numerous. Supplies such as plaster buckets, paint cans, pipe fittings and the like add weight and heft to the worker's on-the-job materials. Many tradesmen transport their tools and supplies in a pick-up truck, thus having to load and unload these items daily, To meet the tool and supply handling needs of diverse workers and tradesmen, a wide variety of work site utility carriers are used.

When tradesmen have to move tools and material around at the work site, the usual transport means is a dolly typically having four wheels and some kind of handle for pulling and steering. The numerous tools themselves must be organized and quickly available for use, and virtually all tradesmen therefore use a portable, lockable metal toolbox. On occasion it is also necessary to move articles besides tools and supplies around the work site that cannot practically be loaded and carried on a dolly, such as a desk, plywood sheets, or a washing machine. For this task a sturdy hand truck is needed.

Work sites typically require a work bench or table as well. This item too must therefore be available on the site to the workman wherever the need for a work table arises. All of these worksite utility items—the dolly, the toolbox, the hand truck and the work table—must be not just transportable to the site but also must be readily loadable across the tailgate of the tradesman's pick-up truck and rolled into position in the truck bed.

Some of the prior art utility carriers usefully combine the functions of a hand truck and a tool cart. Examples are U.S. Pat. No. 2,964,328 issued 13 Dec. 1960 to Muir; and U.S. Pat. No. 5,224,531 issued 6 Jul. 1993 to Blohm which also includes a work surface. Hand trucks with permanently mounted tool carts or boxes are exemplified by U.S. Pat. No. 6,170,839 issued 9 Jan. 2001 to Kizewski which also has a dolly mode and a flat work surface; and by U.S. Pat. No. 5,566,659 issued 31 Dec. 1996 to Boes et al. U.S. Pat. No. 5,419,569 issued 30 May 1995 to Walls shows a hand truck outfitted with a storage container and capability to carry heavy cylinders using straps. Many hand trucks include a pivoted or extendable flat surface to provide a work bench. Examples are U.S. Pat. No. 2,784,004 issued 3 Mar. 1957 to Hamrick and U.S. Pat. No. 4,934,718 issued 19 Jun. 1990 to Voegele. The hand truck of U.S. Pat. No. 6,341,788 issued Jan. 29 2002 to Ciccone also shows a dolly mode that optionally provides an extendable work table. U.S. Pat. No. 6,758,482 issued 6 Jul. 2004 to Stallbaumer slows a hand truck-dolly combination with detachable handles, work surface and tool tub that may be placed in a raised or lowered mode.

Some hand trucks are convertible by various means to a fuller work bench. U.S. Pat. No. 5,642,895 issued Jul. 1, 1997 to Wunder shows a hand truck with retractable legs enabling conversion into a work table. U.S. Pat. No. 5,203,815 issued 20 Apr. 1995 to Miller is a conventional hand truck-dolly that mounts a detachable work table top. U.S. Pat. No. 5,957,472 issued 28 Sep. 1999 to Borgatti is a collapsible hand truck and machine stand. U.S. Pat. No. 6,530,583 issued 11 Mar. 2003 to Mueller shows a dolly for wheeling a power saw attached to a support that swings to the horizontal to provide a table saw when the dolly is tipped upright. The folding work bench/tool table of US patent application publication 2002/0179181 of Dec. 5, 2002 by Murphy combines a dolly frame that mounts a removable tool box, A work table is hinged to two rear legs pivotally mounted on the dolly rear castor frames and two front legs hinged at the dolly frame midsection. The table is held by lockable braces either in an upright mode or a lowered mode in which the table secures the tools.

While the preceding prior art work site utility carriers each offer some versatilities and multiple uses, none provide the full functionalities of a hand truck, a retractable work bench, a safe place to store tools, and a dolly. Moreover, none provide a mechanism specifically adapted to allow the utility carrier to be loaded readily by a tradesman into and out of the bed of a pick-up truck.

SUMMARY OF THE INVENTION

In accordance with an illustrative embodiment of the invention, a work site utility carrier consists of an elongate chassis. A first structure, box-like in shape and providing a bottom tool box, is formed into a first end of the chassis. A second box-like structure that may be a second or top tool box is pivotally mounted on two rear legs that hinge to the top outer edge of the first structure; and on two front legs that hinge to the chassis. The pivotable mounting allows the second structure and its toolbox to transition between a retracted position and an extended position. In the retracted position the top tool box rests on the chassis base adjacent to the bottom tool box. In the extended position the top structure and its toolbox is stationed above the bottom structure.

The top and bottom toolboxes are provided with flat top closures. In its extended position the closure on the top toolbox provides a work bench. In the retracted position, the closures on the top and bottom tool boxes form a flat continuous surface. The flat top closures of the top and bottom toolboxes may be formed as 2-sided doors hinged at the center to allow access from one side or the other to the tools therein. Both closures are lockable. The carrier in this embodiment forms a stationary pair of adjacent tool boxes with the capability to raise one to an upright position where it provides a work table.

The first structure may be supported on wheels such as two fixed pneumatic rear wheels and two front castors to provide mobility for the carrier in its retracted or extended positions. When all four wheels rest on a floor the carrier is in a dolly mode. A hinged and latchable undercarriage disposed on an end of the top toolbox serves as dolly handle. Advantageously the undercarriage also mounts a pair of mini-wheels that extend below the top toolbox to assist in loading/unloading into and out of a pickup truck. The carrier in dolly mode may be wheeled around a worksite on the pneumatic tires and castors, by unlatching the undercarriage and raising the dolly handle to a comfortable user position.

A foot extension is formed at right angles to the top exterior edge of the bottom toolbox. In the carrier's dolly mode the foot is vertical. With the two toolbox aligned in the lowered position. the utility carrier becomes a hand truck simply by lifting the dolly handle of the undercarriage to bring the carrier toward the vertical. The carrier now rests solely on its pneumatic wheels, with the foot extending from the carrier providing leverage lift for the hand truck mode.

An ergonomic handle hinged to an upper edge of the bottom toolbox enables the second structure to be raised and lowered through its pivoting motion. Advantageously, a gas lift spring connected between the chassis and the bottom of the top toolbox compensates for the weight of tools to make movement between the upright and lowered positions. easier for the tradesman.

Means are included to latch the top toolbox in its lowered mode and separately in its elevated position. The latch means ensures that in the carrier's lowered position the second structure is held stably in place on the chassis for safe operation in the hand truck mode. The latch means also ensures that in its upright position the second structure securely latches in place for safe operation in the work bench mode.

Braking devices actuated by a foot lever engage and disengage to the pneumatic wheels. The brakes keep the carrier from rolling in the work bench mode; prevent movement on an incline or when converting from one mode to another; and help keep the carrier in place when transported in a pickup truck.

In accordance with an improvement described in this continuation-in-part application, the pivot points of the front legs are relocated from a central portion of the chassis and a mid-part of the second receptacle, to end portions of the chassis and the second receptacle. In the description of the improvement hereinafter, the pivoting members are "articulating arms". Two "wheelbarrow" handles are pivotally attached at the lower outer end of the second receptacle at the pivot points of the second articulating arm pair. These handles serve several purposes. The handles' top ends support a third wheel pair connected by a grip. The third wheel pair facilitates maneuvering the carrier onto and off of a pick-up truck bed. In this pivot position the handles are secured to the chassis. In a second pivot position the handles are pivoted 90 degrees into a position essentially perpendicular to a planar bottom surface of the second receptacle and locked in that position. The handles are now a powerful lever allowing the carrier in hand truck mode to be in a more nearly vertical posture during use. This greatly reduces the lifting force needed and also improves carrier maneuvering up and down stairs.

From this upright hand truck mode, in preparation to transition to the work bench mode, the handles are lowered to the supporting floor. The carrier now is supported on the fixed wheels and the handles' outer ends. In this "semi-inclined" state, the second receptacle is already partially elevated and thus requires less lifting to fully-elevate. Movement to full bench mode is accomplished by pulling lightly on a handle and simultaneously applying foot force to the chassis. With the wheelbarrow handle ends acting as brakes, this movement causes the chassis to begin moving beneath the second receptacle on its fixed wheels. This motion also commences pivoting of the articulating arms. As the fixed wheel pair moves, the force needed to continue chassis movement into position underneath the second receptacle decreases exponentially due to an increasing mechanical advantage as the articulating arms proceed toward the vertical. In full workbench mode the handles are secured to the lower hinge point of one pair of the articulating arms to rigidify the workbench support system and reduce wracking. The lower handle ends continue to serve as brakes. To transition the carrier to a mobile workbench mode, the handles are disengaged from the articulating arm pair and the second receptacle. The handles are again free to pivot. By pulling lightly on the grip, the handles pivot to lower the second set of chassis wheels to the ground. The handles are placed on support pins extendable from the chassis to keep them out of the way during movement of in its mobile work bench mode.

The invention is more fully described in the account to follow of a specific illustrative embodiment.

BRIEF DESCRIPTION OF THE DRAWING

FIGS. 5-7 are perspective views showing release/lock of latching means to secure the carrier in retracted mode;

FIG. 8 is a perspective view showing braking and release/lock of latching means to secure the carrier in extended mode;

FIG. 8A is an alternate brake arrangement;

DETAILED DESCRIPTION OF ILLUSTRATIVE EMBODIMENTS

Figure 1:
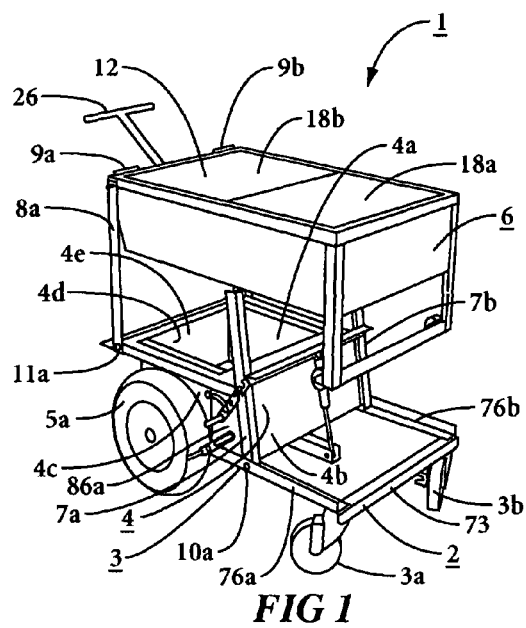
FIGS. 1-4 are perspective views of the carrier illustrating pivotal movement.

An illustrative embodiment of utility carrier 1 is shown in FIGS. 1-4. Carrier 1 consists of a chassis 2 formed as an elongate frame of welded or bolted sections of angle irons 76a, 76b joined by transverse L-bracket 73. One or more castor wheels are mounted at one end of chassis 2, the 2-wheel set shown in FIG. 1 denoted 3a, 3b being preferred. Pneumatic tires 5a, 5b are mounted at the other end of chassis 2, both shown in FIG. 15.

A first structure 4 illustrated as a 4-sided receptacle is affixed to and extends from angle irons 76a, 76b. A second structure 6 illustrated as another 4-sided receptacle is pivotally mounted at one end on structure 4 and at its center portion on chassis 2. It is understood that either structure 4 or structure 6 may take some shape other than a 4-sided box. For purposes of describing the invention, the general term "structure" is used; and the structures 4 and 6 illustrated herein are 4-sided receptacles.

Figure 2:
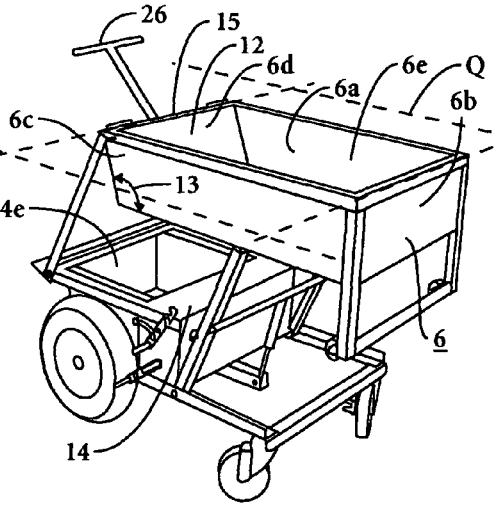
Figure 2A:
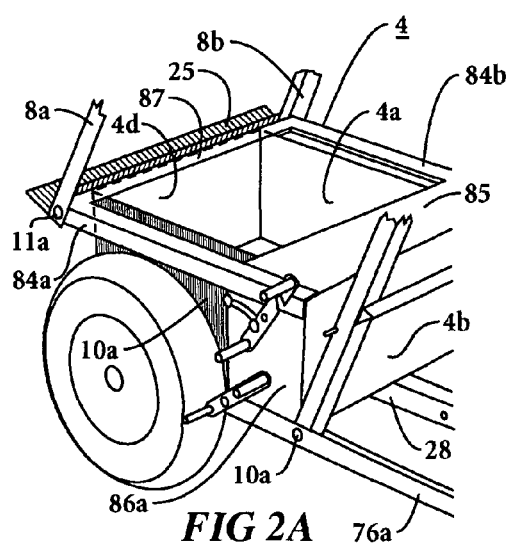
FIG. 2A is a side perspective view in greater detail than shown in FIG. 2.

Structure 6 may be formed as a relatively deep receptacle for carrying tools or supplies. Structure 6 consists of four sides 6a, 6b, 6c, 6d, a flat bottom 40b and a planar open top 6e. Referring also to FIG. 2A, structure 4 consists of sides 4a, 4c connected to rear end 4d. A front end 4b is a rectilinear box-like structure having a top surface 85 and two end surfaces 86a, 86b that extend beyond sides 4a, 4c to form wheel wells 72a, 72b. These structures are seen fully in FIG. 15. Structure 4 has a flat bottom 40a and a planar open top 4e. Braces 84a, 84b seen in FIG. 2A and formed with angle irons are fastened to top 85 and to the end surfaces 86a, 86b. Braces 84a, 84b seen in FIG. 2A extend back over wheel wells 72a, 72b and join at their ends to a rear angle iron 87 fastened to end 4d. A foot platform 25 is connected to the ends of legs 8a, 8b and moves as the legs pivot.

Figure 4:
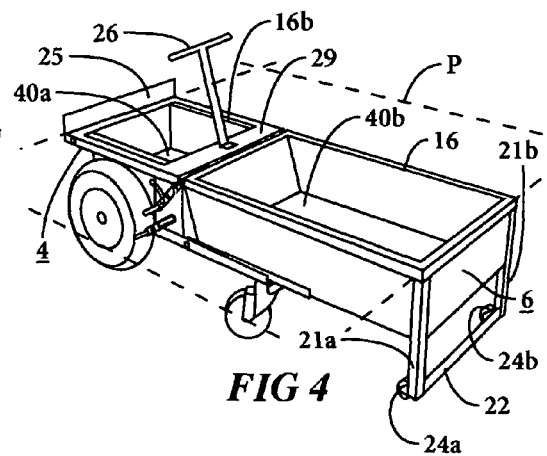

The pivotal movement of structure 6 with respect to structure 4 is from an upright position shown in FIG. 1 to a retracted position shown in FIG. 4. In the retracted position, the plane in which top surface 6e of structure 6 comes to rest is substantially coincident with the plane of top surface 4e of structure 4. The coincident plane is indicated by the plane denoted "P" in FIG. 4. When structure 6 is in other than its retracted position, the top surfaces 4e and 6e are held in parallel relation to each other by the pivoting movement.

Figure 9:
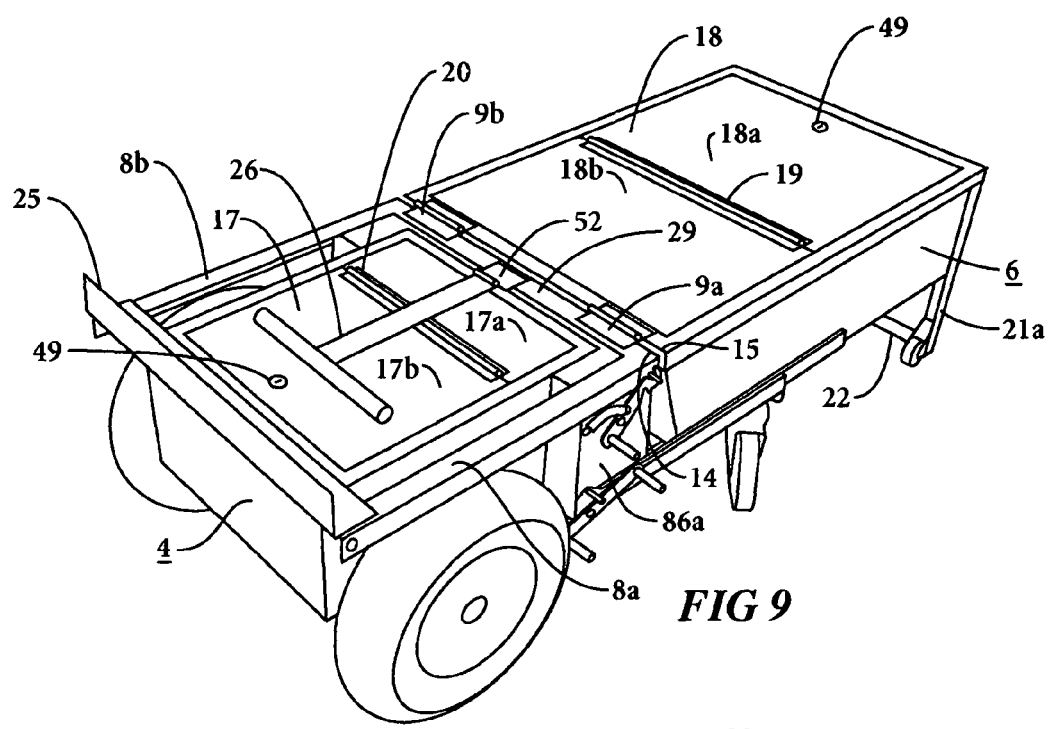
FIG. 9 is a top perspective view of the carrier in dolly mode.
Figure 11:
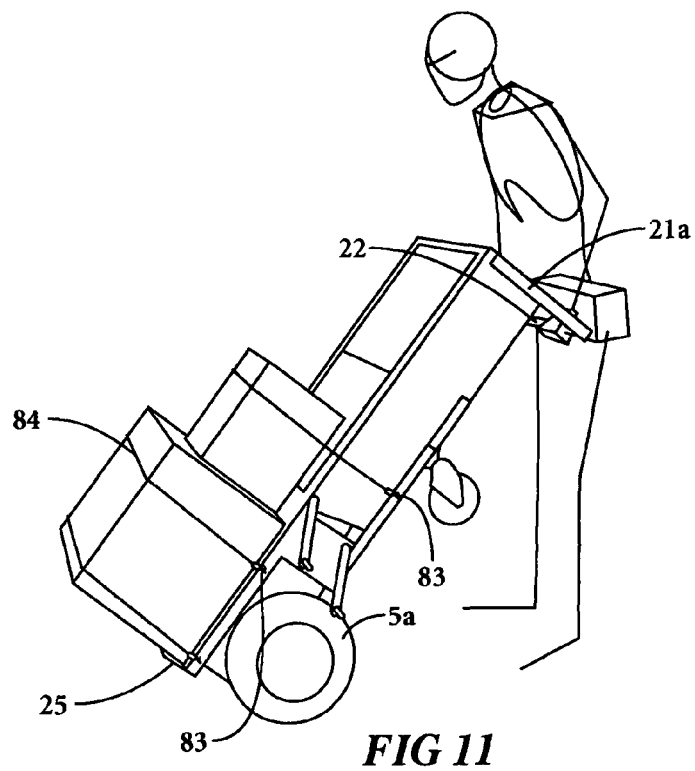
FIG. 11 is a sketch illustrating use of the carrier in hand truck mode.

In accordance with the invention, one benefit of having top surface 4e and top surface 6e fall in the same plane when structure 6 is pivotally retracted to the position of FIG. 4, is that a continuous flat area is thereby defined. This flat area provides a floor of a dolly, and also provides the bed of a hand truck. The flat area is better defined as shown in FIG. 9, by adding a flat closure 17 to occupy the open side 4e (FIG. 1) of closure 4, and a flat closure 18 to occupy the open side 6e (FIG. 2) of closure 6. FIG. 11 illustrates how the dolly mode of FIG. 9 provides a configuration that enables the hand truck mode.

Figure 16:
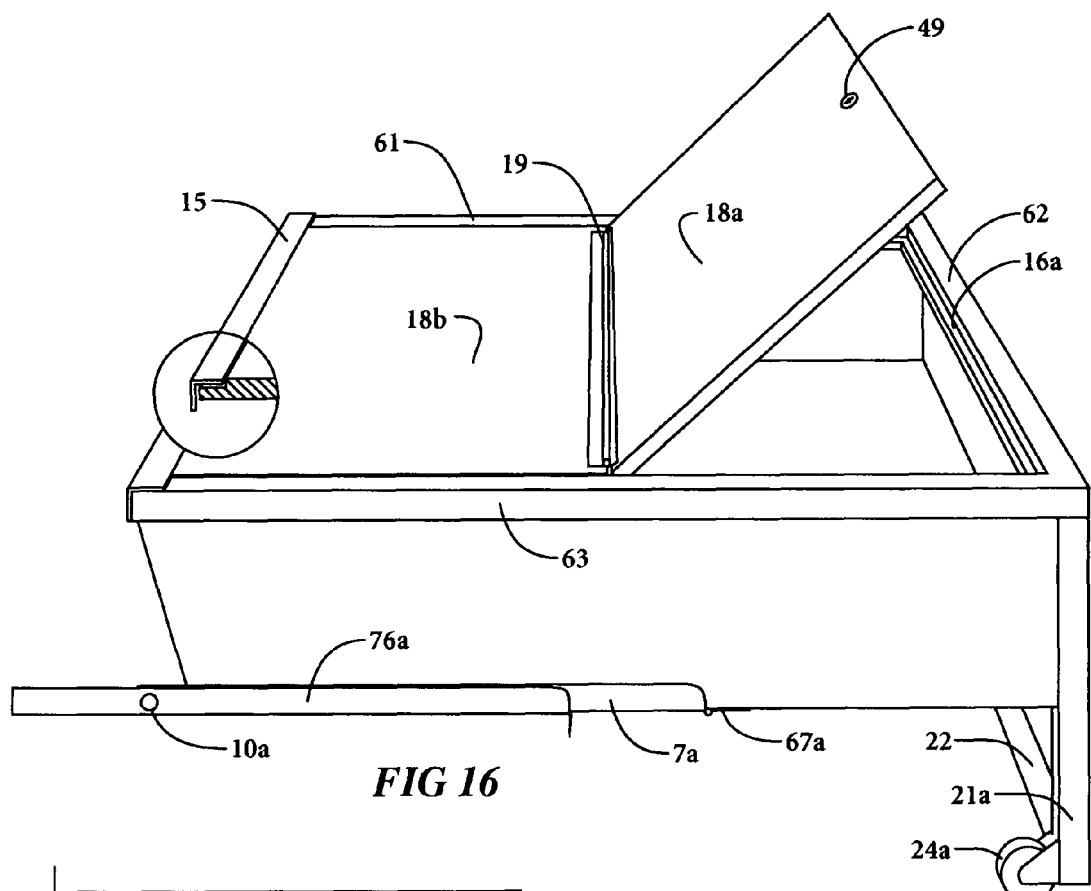
FIG. 16 is a side perspective view showing top tool box hinged closure and mount, and lock means.

As shown in FIG. 9, closure 17 may consist of a hinged 2-sided door 17a, 17b; and likewise closure 18 may consist of a hinged 2-sided door 18a, 18b. The desired continuous essentially planar surface is formed by the top side of doors 17a, 17b of closure 17 and the top side of doors 18a, 18b of closure 18 served by a common hinge 19. Closure 18 rests on a lip 16a formed in structure 6 within the open top side 6e, as shown in FIG. 16. Closure 17 rests in a lip 16b within top surface 4e as seen in FIG. 4.

Figure 1A:
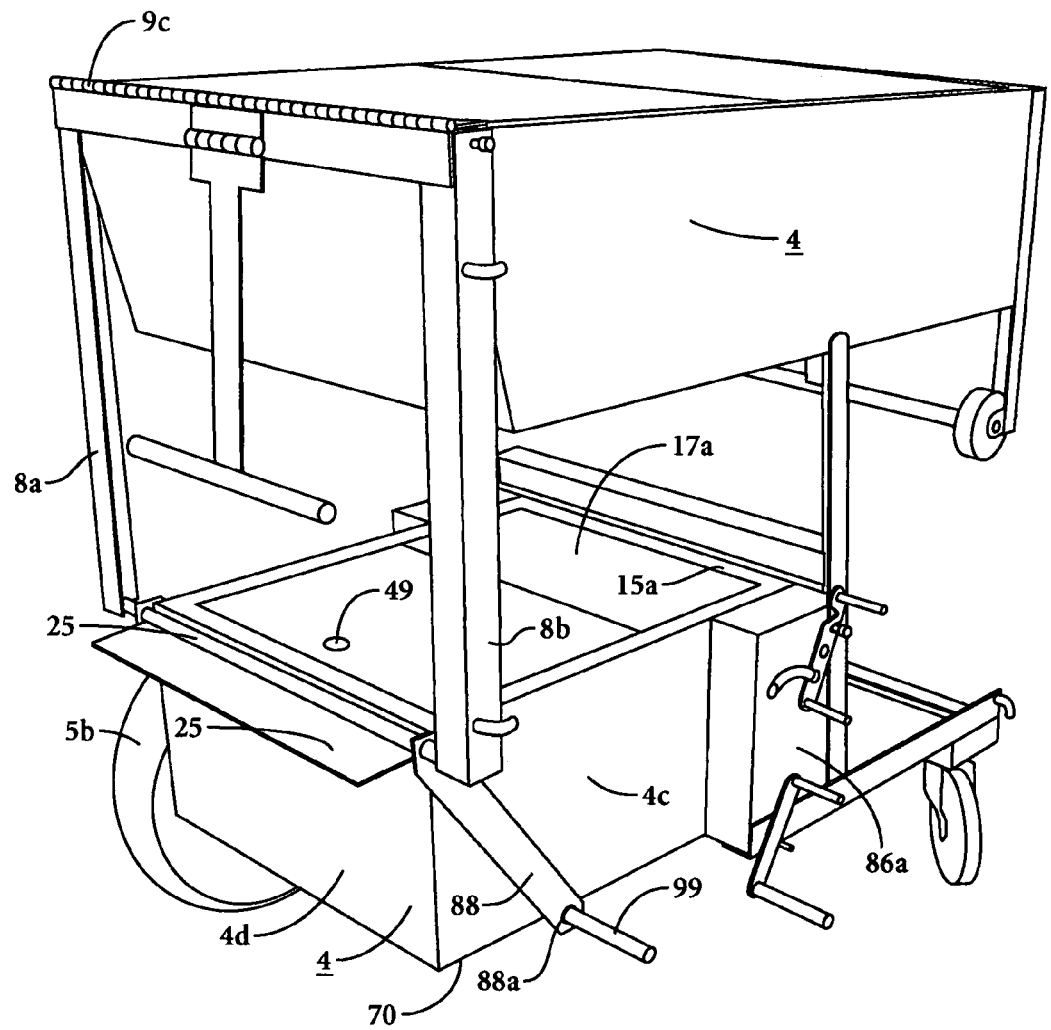
FIG. 1A is a side perspective view of another version of the carrier of FIG. 1.
Figure 14:
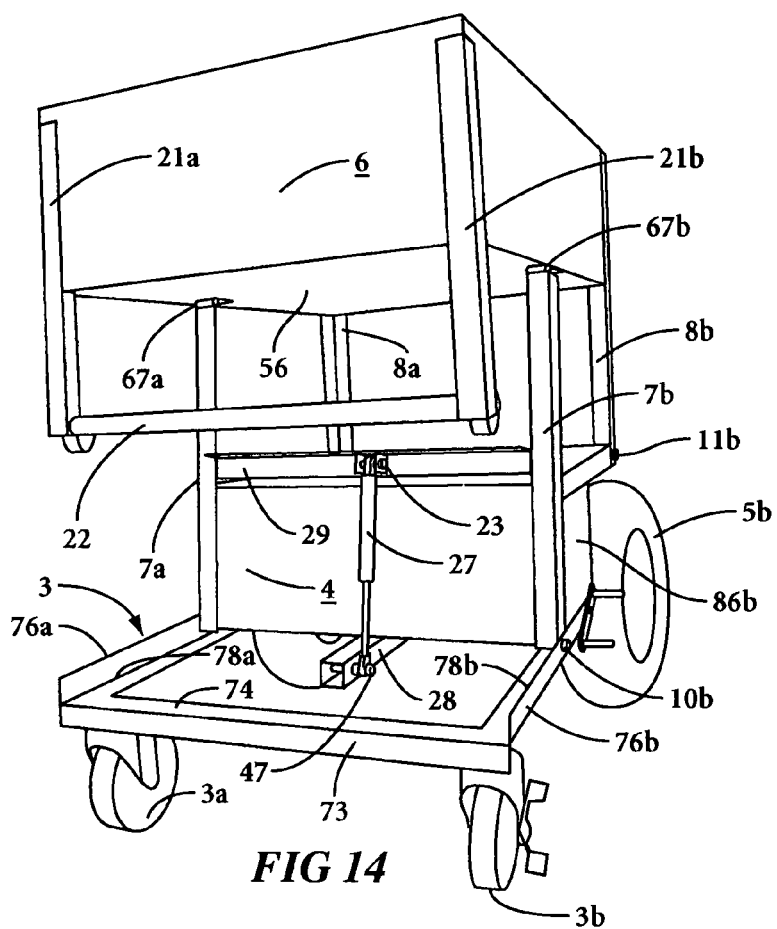
FIG. 14 is a front perspective view of the carrier in extended mode showing undercarriage, gas spring mounting and pivotable legs.

One manner of accomplishing the pivoting movement of structure 6 with respect to structure 4, as is illustrated in the sequence of positions shown by FIGS. 1-4, will now be described. Legs 7a, 7b, are pivotally connected at their respective bottom ends to pins 10a, 10b extending from angle irons 76a, 76b. The top ends of legs 7a, 7b are hinged on hinges 67a, 67b as seen in FIG. 14 to the underside 56 of structure 6 at about the mid-section thereof. Referring again to FIG. 9, legs 8a, 8b are connected at their top ends by a crossbar 29. Crossbar 29 is hinged by hinges 9a, 9b to the front upper edge 15 of structure 6. The separate hinges 9a, 9b may be replaced by a continuous hinge spanning the length of side 6d. as shown in FIG. 1A. The bottom ends of legs 8a, 8b pivot on pins 11a, 11b respectively which extend from the ends of braces 84a, 84b. The pins 10b and 11b are shown in FIG. 14.

FIG. 1 shows structure 6 in its elevated, fully extended position, in which it is locked upright in a manner to be described. Once unlocked from its upright position, movement of structure 6 towards its retracted position is effected by the user grasping T-handle 26 and applying pushing force. The resulting movement is shown in FIG. 2. Legs 7a, 7b and 8a, 8b commence pivoting to begin a forward and downward movement of structure 6. Gravity force soon takes over, requiring the user to restrain downward movement with pulling force. During pivoting, the plane in which top surface 6e of structure 6 lies, denoted "Q" in FIG. 2, remains horizontal and parallel to a floor on which carrier 1 rests. In all positions, top surface 6e is also parallel to the plane "P" shown in FIG. 4 in which top surface 4e of structure 4 resides. Maintaining of parallelism may be achieved by appropriate selection of the lengths of the legs 7a, 7b and 8a, 8b, as well as their pivoting positions on chassis 2 and structure 4.

Figure 3:
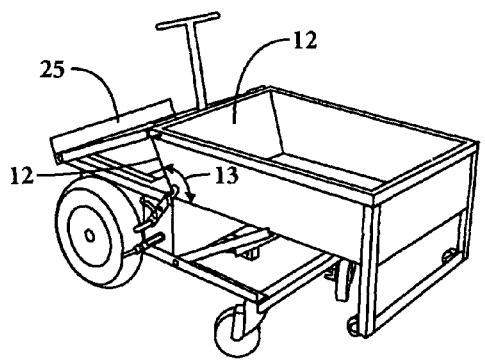

FIG. 3 shows that the end 12 of structure 6 formed by side 6d, is provided with an inward offset indicated by the obtuse angle 13. The offset enables end 12 during its travel down or up to clear the upper front edge 14 of structure 4 shown in FIG. 2. Thereafter, the offset allows the two structures 4 and 6 to nest closely together when in their retracted position. The close nesting is shown in FIG. 9, with the upper edge 14 of structure 4 and the adjacent upper edge 15 of structure 6 in close proximity. Close nesting is desirable to make the co-planar dolly bed and hand truck bed surfaces earlier described be as continuous as possible.

Figure 15:
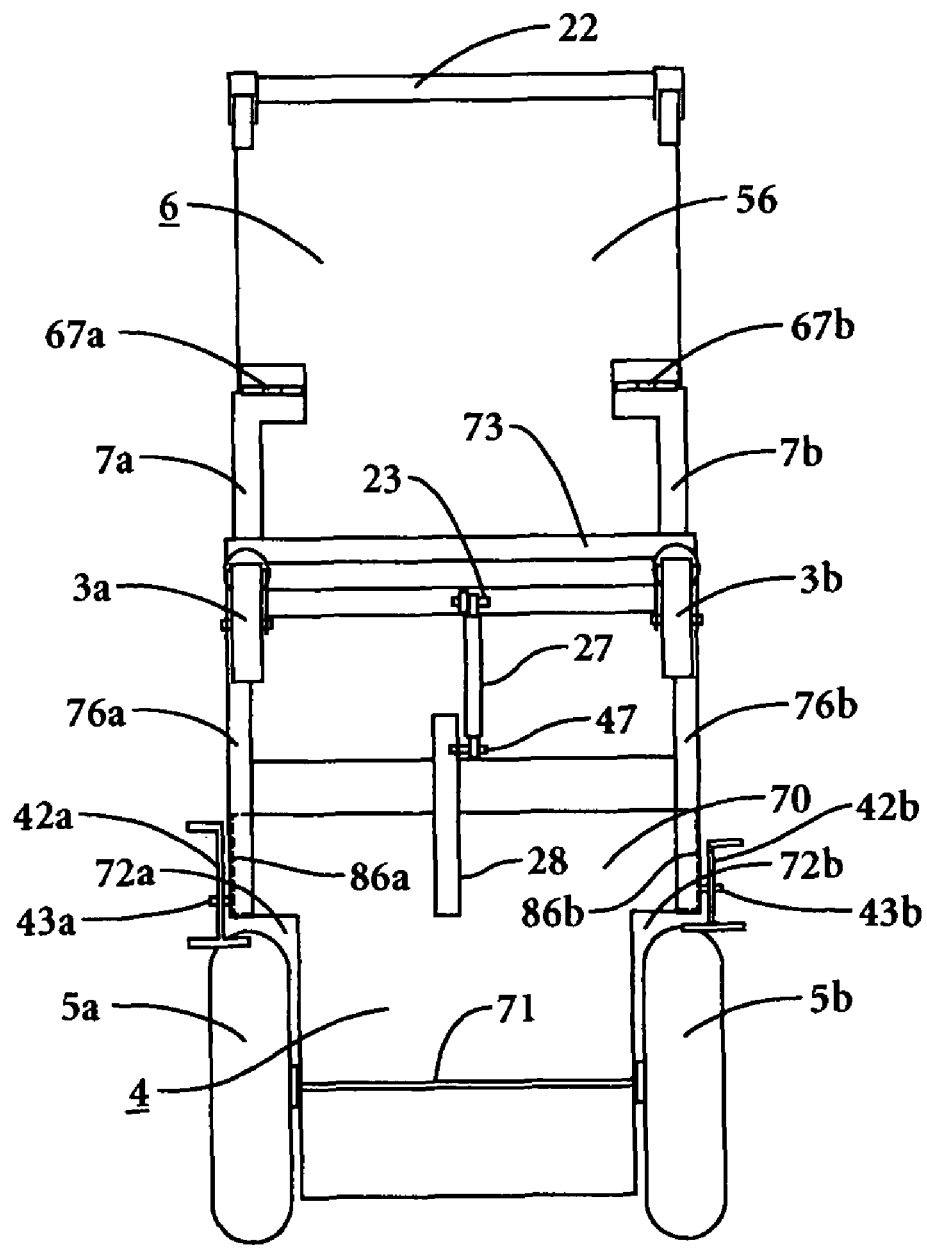
FIG. 15 is a bottom planar view of the carrier showing wheel wells and braking means.

Referring to FIGS. 14 and 15, chassis 2 is formed with the afore-noted two L-shaped angle irons 76a, 76b fastened to the underside 70 of end 4b. Angle irons 76a, 76b extend forward to join with transverse L-bracket 73. The interior sides 78a, 78b of angle irons 76a, 76b face inwardly, to form along with the top 74 of bracket 73 a planar lip on which the undersides of legs 7a, 7b come to rest when carrier 1 is in the dolly or hand truck mode.

Referring to FIGS. 15, the recessing of sides 4a, 4c of structure 4 form wheel wells 72a, 72b for tires 5a, 5b. The latter are mounted for rotation on a fixed axle 71 which may be fastened to plate 70 that forms bottom 40*a* of structure 4.

Figure 5:
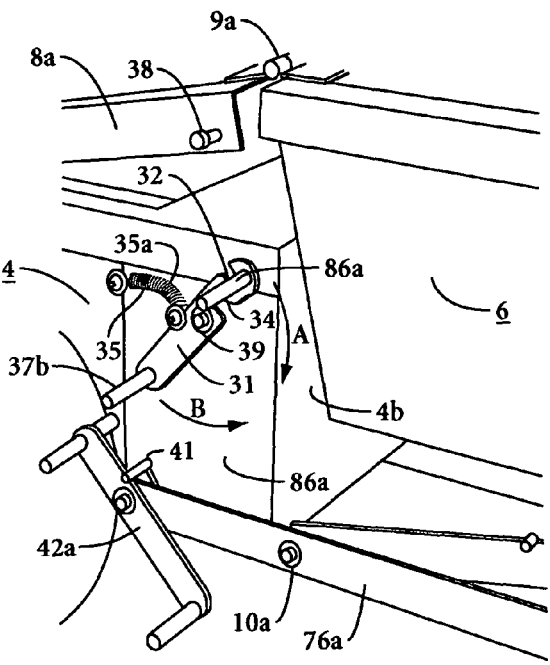
Figure 6:
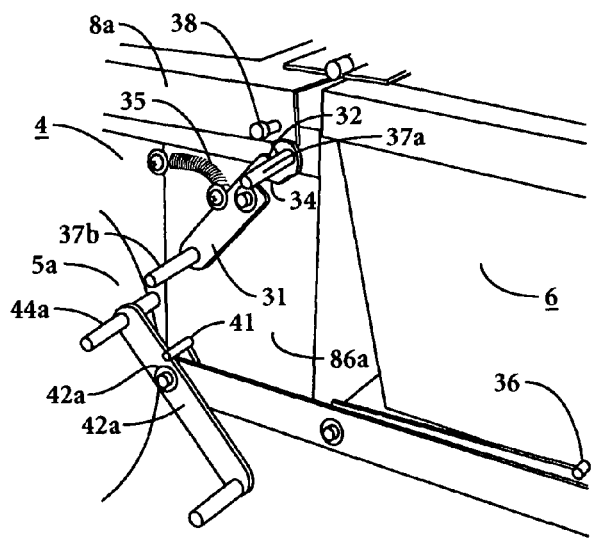

To lock carrier 1 in its upright mode and separately in its retracted mode, a latching means is provided. Referring to FIGS. 5, 6 and 7, a mechanism for locking structure 6 in the retracted position consists of a release-lock arm 31 rotatably mounted on a pivot pin 39 extending from a side 86*a* of structure 4. Release-lock arm 31 is formed with a first indent 32 facing upward at a first end; and a second indent 34 facing downward and located between first indent 32 and pivot pin 39. A push rod 37*a* extends from the top end of arm 31; and a push rod 37*b* extends from the bottom end of arm 31.

Coil spring 35 mounted between release-lock arm 31 and the side 86*a* of structure 4 provides a dual bias to arm 31. Spring 35 is sized to have a slight bend 35*a* when in the position shown in FIG. 6. When rod 37*a* is pressed in the direction of arrow A to disengage lock arm 31, spring 35 will compress. When pressure on rod 37*a* is released, spring 35 expands to return lock arm 31 to its position of FIG. 6. With carrier 1 in its upright position as in FIG. 8, as rod 37*b* is pressed in the direction of arrow B to disengage release-lock arm 31, spring 35 expands in tension. When pressure on rod 37*b* is released spring 35 contracts, again to return lock arm 31 to its position of FIG. 6.

As structure 6 pivots downwardly through the position shown in FIG. 3 it approaches the full retracted mode of FIG. 4, FIG. 5 shows in more detail the approach position, where a set pin 38 protruding from leg 8*a* of structure 4 lines up to engage the indent 32. Engagement begins shortly after the positioning shown in FIG. 6. With contact of arm 31 on pin 38, arm 31 is forced downward against spring 35. As shown in FIG. 7, when structure 6 comes to rest on chassis 2, the interior slot of indent 32 locks onto set pin 38, and is held in position by spring 35. Structure 6 is now secured in its seat on chassis 2 as shown in FIG. 4. The dolly mode shown in FIGS. 9 and 10 and the hand truck mode shown in FIG. 11 are thus enabled. Latching also prevents structure 6 from pivoting off of chassis 2 when carrier 1 is lifted into a pickup truck, for example.

The release-lock arm 31 that locks structure 6 in its retracted position serves also to lock structure 6 in its upright position shown in FIG. 8. To prepare to raise structure 6, the user presses down on rod 37*a* which releases lock arm 31. A pulling force applied to T-handle 26 causes structure 6 to commence upward travel with legs 7*a*, 7*b* and 8*a*, 8*b* all pivoting. At the end point of upward travel, second indent 34 of release-lock arm 31 encounters a set pin 36 affixed to leg 7*a* as shown in FIG. 5 and elsewhere. With pressure from set pin 36, release-lock arm 31 begins to pivot against the bias from spring 35, until, as shown in FIG. 8, second indent 34 fully engages onto set pin 36. Now, structure 6 is again locked, this time in its upright position as shown in FIG. 1. Release of structure 6 from the upright position is effected by the user pressing against push rod 37*b*.

FIG. 2A illustrated one way to hinge-mount legs 8*a*, 8*b* and a foot platform 25 onto structure 4. Another way, which eliminates braces 84*a*, 84*b* and provides strengthened pivoting motion is shown in FIG. 1A and will now be described. An elongate bar 88 is affixed to side 4*c* and an identical bar 88 not shown is affixed to side 4*a*. Each bar 88 includes a bottom circular hole 88*a* positioned below the bottom 70 of structure 4. A metallic tube 99 is contained in holes 88*a* and extends outwardly beyond surface 4*c*. Tires 5*a*, 5*b* mount conventionally onto the extending portions of tube 99.

Bars 88 also contain a top circular hole 88*b* positioned slightly beyond rear end 4*d* of structure 4. A solid metal rod 89 is mounted for rotational movement into holes 88*b*. The ends of rod 89 are welded to the bottom portions of legs 8*a*, 8*b* to create an integral frame structure of these components. Foot 25 is welded across rod 89 in an essentially perpendicular orientation to legs 8*a*, 8*b*. Foot 25 will pivot with the pivoting of legs 8*a*, 8*b*.

Use of carrier 1 as a hand truck requires use of foot 25 either formed as an extension of side 4*d* of structure 4 as seen in FIG. 3, or as welded to rod 89 as in FIG. 1*a*. Foot 25 provides bottom support for cargo as illustrated in FIG. 11. Hooks 83 placed along legs 8*a*, 8*b* and angle irons 76*a*, 76*b* as seen in FIG. 1A provide places to secure bungee cords 84. The hand truck handle is provided by grip 22 connected between legs 21*a*, 21*b* as seen in FIG. 4 and elsewhere. Grip 22 enables a worker to maneuver carrier 1 in the hand truck mode on its pneumatic tires 5*a*, 5*b* along a floor or down a staircase.

FIG. 16 shows how the front edge of side 18*b* of closure 18 fits under front upper edge 15 of structure 6 on a lip 16*a*. A similar fit is provided for side 17*a* of structure 17 to fit under upper rear edge 15*a* of structure 4 as seen in FIG. 1A. A conventional key lock 49 installed on sides 17*b* and 18*a* enables the lock tongue (not shown) to position under the metal of structures 6 and 4.

Preferably with the closure 18 installed, use of carrier 1 as a work table is illustrated by reference to FIG. 1. It is seen that the two-sided door 18*a*, 18*b* when closed as in FIG. 9, forms a surface that is adapted for a flat work table. To enlarge the work area, whether or not closure 18 is installed, an overlay flat surface such as a plywood piece (not shown), may be affixed to structure 6 at top surface 6*e*. Either configuration provides ample space for using power hand tools, a vise, or a portable table saw mount. An electrical outlet convenience box (not shown) may be incorporated into carrier 1. The work table seen in FIG. 1 is useful also for spreading drawings and can serve as a lunch table.

When closures 17, 18 are installed, materials may be stacked thereon when carrier 1 is either in its upright mode of FIG. 1 or in its retracted mode of FIG. 9. Closures 17, 18 may be removed altogether to allow full access to the interior space of structures 4 and 6.

Figure 13:
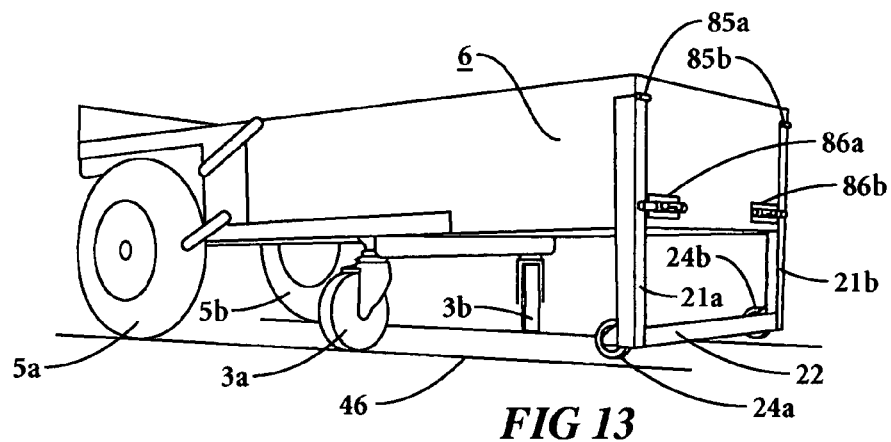
FIG. 13 is a side perspective view of the carrier in dolly mode showing clearance of mini-wheels from floor.

Legs 21*a*, 21*b* also serve as mounting for auxiliary wheels 24*a*, 24*b*. Wheels 24*a*, 24*b* may be mounted so that as shown in FIG. 13 when carrier 1 is in dolly mode wheels 24*a*, 24*b* do not contact a floor 46 on which carrier 1 rests. Providing a clearance between wheels 24*a*, 24*b* and a floor 46 enable tires 5*a*, 5*b* and the castor wheels 3*a*, 3*b* to fully support carrier 1. Wheels 24*a*, 24*b* can, however, extend fully to the floor if desired, in which case wheels 24*a*, 24*b* advantageously are castor wheels (not shown).

To maintain carrier 1 in a stationary position, carrier 1 is outfitted with some means for preventing tires 5*a*, 5*b* from moving. The braking mechanisms shown in FIGS. 7, 8 and 8*a* are merely illustrative. Referring also to FIG. 15, Brake levers 42*a*, 42*b* are rotatably mounted on pivot shaft 43*a*, 43*b* affixed respectively to surfaces 86*a*, 86*b*. Levers 42*a*, 42*b* at their tire-contact end include jam rods 44*a*, 44*b*. Levers 42*a*, 42*b* at their remote ends mount pedals 45*a*, 45*b*. Each peddle 45*a*, 45*b* is sized to be operated by a user's foot. In the release position, levers 42*a*, 42*b* are spaced from tires 5*a*, 5*b* by their own weight as illustrated in FIG. 7. Their movement is further constrained by pin stops such as pin stop 41*a* in FIG. 7 mounted on the lower portion of surface 86*a*. Pin stop 41*a* keeps peddle 45*a* extending outwardly to enable the user to conveniently reach peddle 45*a*.

To set the brake, the user puts downward force on jam rod 44*a* which presses firmly into tire 5*a*. As brake lever 42*a* continues to rotate, jam rod 44*a* passes beyond a point of maximum penetration into tire 5*a*. At this point, lever 42*a* comes up against pin stop 41a. In this position jam rod 44a is powerfully lodged in position by force of the air pressure in tire 5a, and action of pin stop 41a. To release the brake, the user places downward foot pressure on peddle 45a. After enough force is applied to offset the tire pressure, lever 42a snaps back into its release position. It is understood that braking mechanisms are installed on the other side in wheel well 72b as a mirror image using the components described above.

An alternative to fastening pin stop 41a to the lower portion of surface 86a as just described, is to mount pin stop 41a from the underside of angle iron 76a as illustrated in FIG. 8A.

To provide some offset from the weight of structure 6 and its content as it elevates and retracts, some biasing means is advantageous. One such means is the gas spring 27 shown in FIG. 14 in an extended mode and in FIG. 15 in a retracted mode. Gas spring 27 is mounted on a pin 47 protruding from the end of a bar 28 affixed to and extending out from under the underside 70 of structure 4. At its top end gas spring 27 connects to a pivot pin and bracket assembly 23 mounted on crossbar 29 connected between legs 7a, 7b.

An alternative way of mounting gas spring 27 is illustrated in FIG. 8A. A bracket assembly 100 affixed to the exterior of side 4b of structure 4 holds the bar 28

With carrier 1 in its retracted position, gas spring 27 is fully biased or charged. As the user lifts structure 6 from the retracted position using handle 26, the initial movement of structure 6 is mainly in the vertical direction. At this point gas spring 27 assists maximally in the lifting. As lifting continues and legs 7a, 7b, 8a. 8b swing in an arc, the mechanical advantage inherent as the legs pivot offsets the decreasing bias of gas spring 27. This enables the user to apply a decreasing pull force to effect upward vertical movement of structure 6. Structure 6 comes to its at-rest position as in FIG. 8, where legs 7a, 7b extend beyond the vertical as indicated by the acute angle "A" shown in FIG. 8. Once legs 7a, 8a are beyond the vertical gas spring 27 relaxes somewhat. Gravity and gas spring 27 thus provide two forces which combine to keep structure 6 safely in its extended position even when the latching mechanisms described above are released.

When structure 6 is lowered starting from this point, the user must overcome not only the weight of structure 6 and its contents but also some bias applied by gas spring 27. The user therefore applies a push force. However, as the legs 7a, 7b move through their vertical point, gravity begins to force structure 6 downward, but gravity is offset by an increasing force from gas spring 27. which allows the user to ease structure 6 with a pulling motion into its retracted mode.

Figure 19:
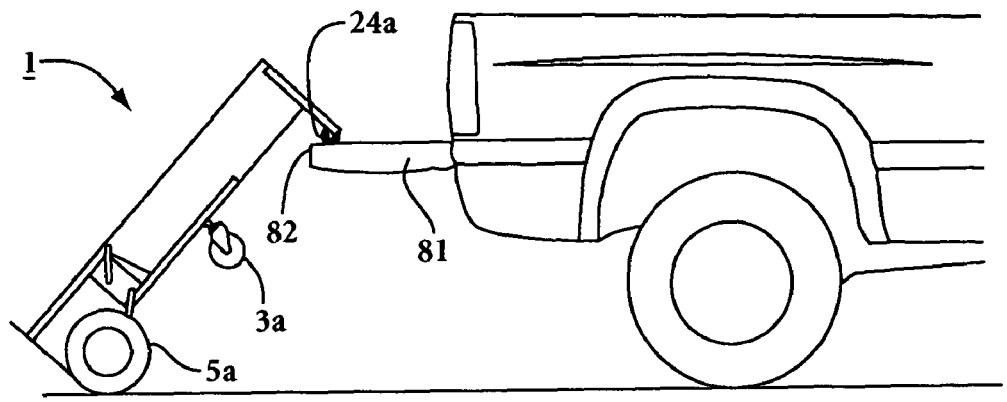
FIGS. 19-21 are a sequence of sketches showing loading of the carrier into a pickup truck.
Figure 20:
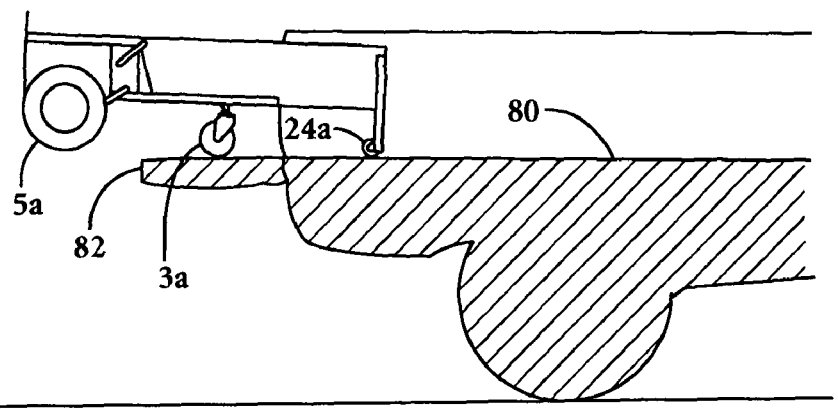
Figure 21:
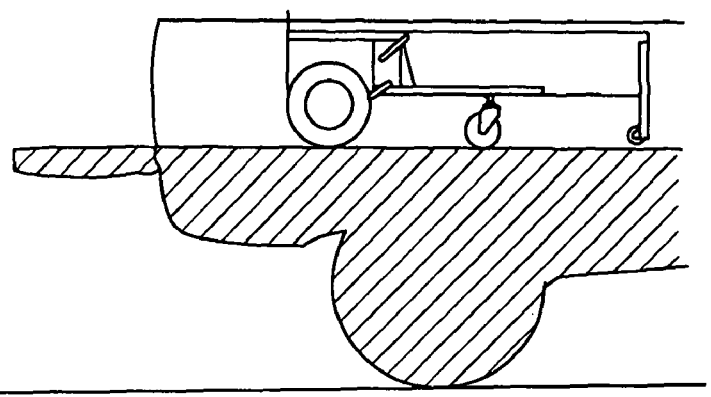

The primary utility of wheels 24a, 24b is their ability to provide a "purchase" on an elevated surface which a worker wants to maneuver carrier 1 onto. For example as seen in FIGS. 19, 20 and 21, auxiliary wheels 24a, 24b facilitate loading carrier 1 onto a bed 80 of a pickup truck. Carrier 1 is positioned upright next to the open tailgate 81. Next, as seen in FIG. 19, the user reclines carrier 1 onto the edge 82 of tailgate 81. The user lifts carrier until auxiliary wheels 24a, 24b contact bed 80. With some of the weight of carrier 1 now on wheels 24a, 24b, the user lifts and moves carrier 1 across gate 81 and onto bed 80 as shown in FIG. 20. As soon as castor wheels 3a, 3b clear edge 82 of tailgate 81, they and wheels 23a, 23b provide support of carrier 1. When pneumatic tires 5a. 5b land on tailgate 81, carrier 1 is in its dolly mode. The user now can maneuver carrier 1 fully into the truck as seen in FIG. 21. Now, the brakes are set and carrier 1 may be further secured with stays in the bed 80 for travel. Removing carrier 1 from the pickup truck bed follows a reverse process of that described above.

Figure 10:
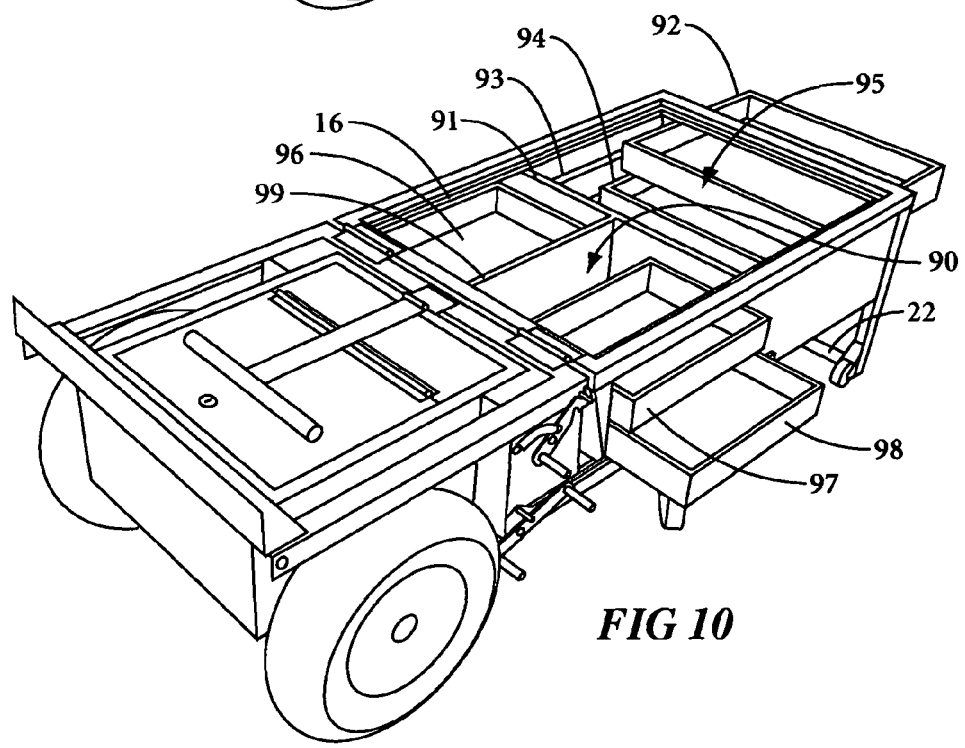
FIG. 10 is a top perspective view showing the carrier equipped with tool drawers.
Figure 12:
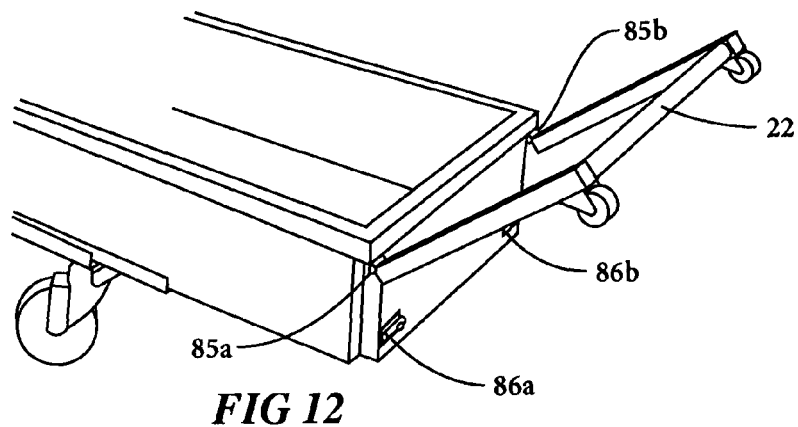
FIG. 12 is a partial side perspective view showing a dolly mode handle.

FIGS. 12 and 13 show a way to adapt legs 21a, 21b and grip 22 to provide a swing-up handle for moving carrier 1 when in dolly mode. The upper edge of legs 21a, 21b may be hinged to structure 6 instead of being fixed as shown in FIG. 10. Hinges 85a, 85b allow the legs and grip 22 to swing upwardly, giving the user a convenient handle to push or pull carrier 1 on its castor wheels 3a, 3b and tires 5a, 5b. Slide locks 86a, 86b are moved to release legs 21a, 21b for upward pivoting movement. The slight clearance afforded between wheels 24a, 24b an a floor 46 shown in FIG. 13 maintains carrier 1 weight on wheels 3a, 3b and 5a, 5b, which makes it easier when legs 21a, 21b are hinged to place them in an upraised position.

For applications of the invention in the automotive trade, for example, where a premium is placed on compartmentalization and organizing of tools, structure 6 may take the form shown in FIG. 10. The 4-sided receptacle of structure 6 is sectioned by divider 91 into a rear compartment 90 and a front compartment 95. Without the drawers installed as shown in FIG. 10, compartment 90 stores tools and supplies. Divider 91 serves to constrain anything kept in compartment 90 from shifting as structure 6 is repositioned. On the other side of divider 91 compartment 95 houses one or more tool drawers such as drawer 92 riding on drawer guides 93; and drawer 94 riding on similar drawer guides (not shown). Compartment 95 can be devoted exclusively to tool drawers; or fewer drawers may be housed beneath a horizontal separator (not shown) fastened below the lip 16 to sides 6a, 6b, 6c. Another alternative is to devote structure 6 exclusively to tool drawers as illustrated in FIG. 10, which shows drawers 96, 97, 98 mounted in compartment 90.

Figure 17:
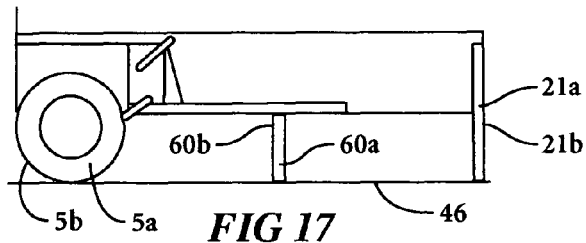
FIG. 17 is a sketch showing the carrier equipped with four legs and pneumatic tires.
Figure 18:
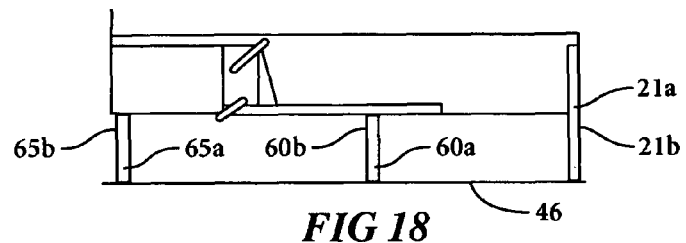
FIG. 18 is a sketch showing the carrier as a stationary aid supported only on legs and without wheel support.

As already stated, castor wheels 3a, 3b provide a dolly or work bench mode for carrier 1; and auxiliary wheels 24a, 24b allow a convenient way for the carrier to be loaded into a pickup truck. If castor wheels 3a, 3b and wheels 24a, 24b are omitted, carrier 1 still functions in a hand truck mode. As shown in FIG. 17, substituting legs 60a, 60b in place of castor wheels 3a, 3b provides full support for carrier 1 as it rests on a floor. The support may be augmented by extending legs 21a, 21b to the floor. Carrier 1 may be used as a hand truck or as an upright work table if configured as in FIG. 17. If as in FIG. 18 legs 65a, 65b are substituted for tires 5a, 5b, carrier 1 may still be used as an essentially stationary two-receptacle side-by-side tool box with the capacity to position one receptacle above the other in the manner shown in FIGS. 1-4. Even with no wheels on carrier 1, the elevated structure 6 may serve as a work table as described.

An improvement on the invention in accordance with this continuation-in-part application may be realized in the embodiment of utility carrier 1 shown in FIGS. 22 through 34. Structures 4 and 6 of the earlier embodiment are used without change except for their points of pivoting. Structures 4 and 6 are depicted as box-shaped; but can take on other shapes. New pivotable wheelbarrow handles 100a, 100b and a revised pivoting arrangement of structure 6 and chassis 2 greatly reduce the effort needed to effect a transition between dolly mode and workbench mode. The user effort needed to support and maneuver the utility carrier in its hand truck mode also is lessened by the handles 100a, 100b. The components enabling these improvements eliminate need for mechanical brake levers 42a, 42b and associated components, as well as gas spring 27. The alternative arrangement and its operation are next described.

Figure 22:
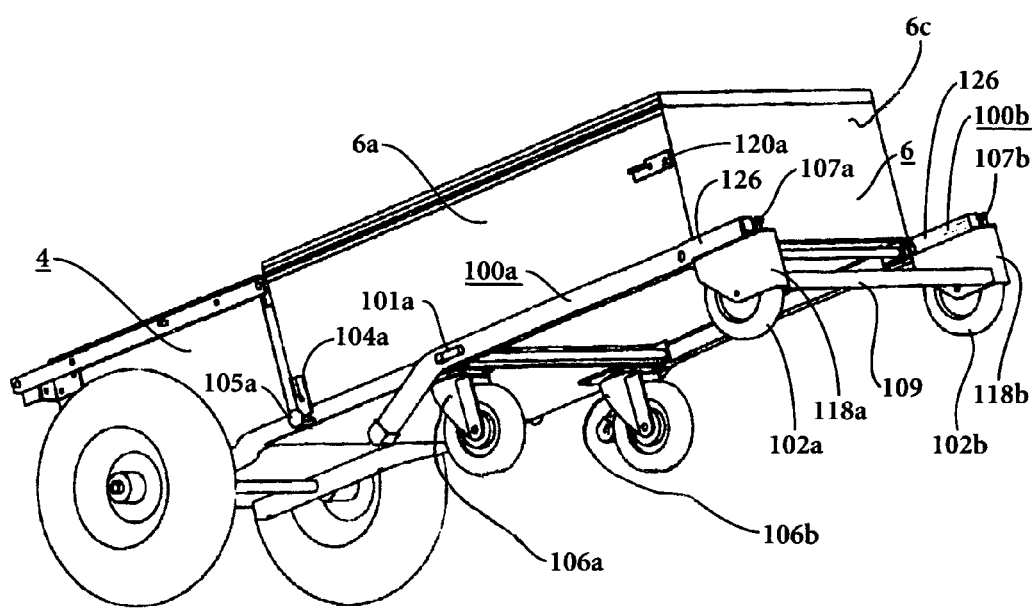
FIG. 22 is a side perspective view of a carrier with pivotable wheelbarrow handles shown in its dolly mode.
Figure 23:
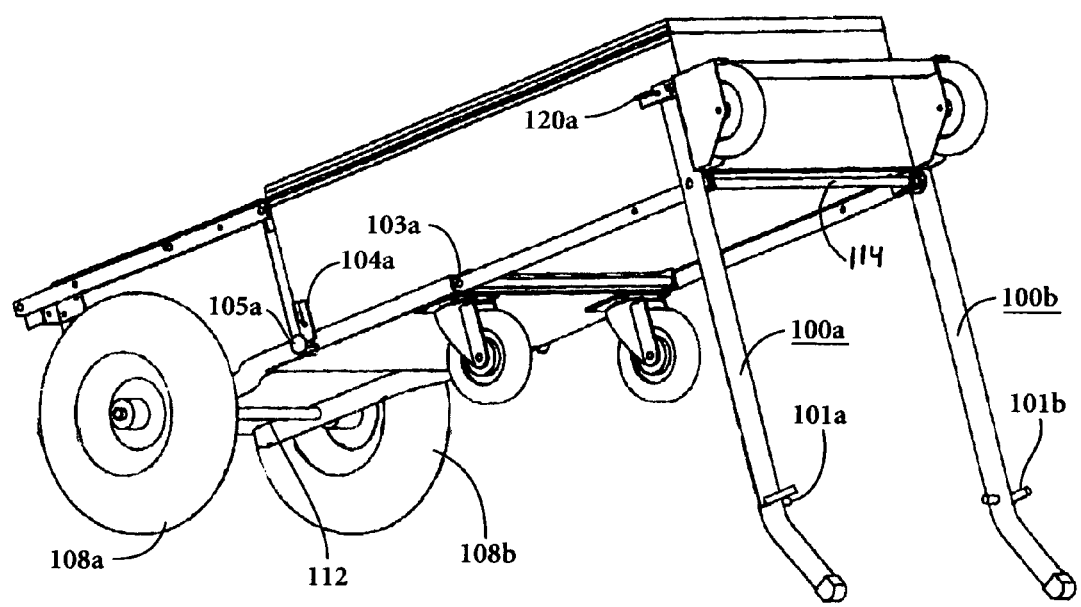
FIG. 23 is a side perspective view of the carrier of FIG. 22 showing the handles extending at 90 degrees to the bottom side of the second receptacle.
Figure 24:
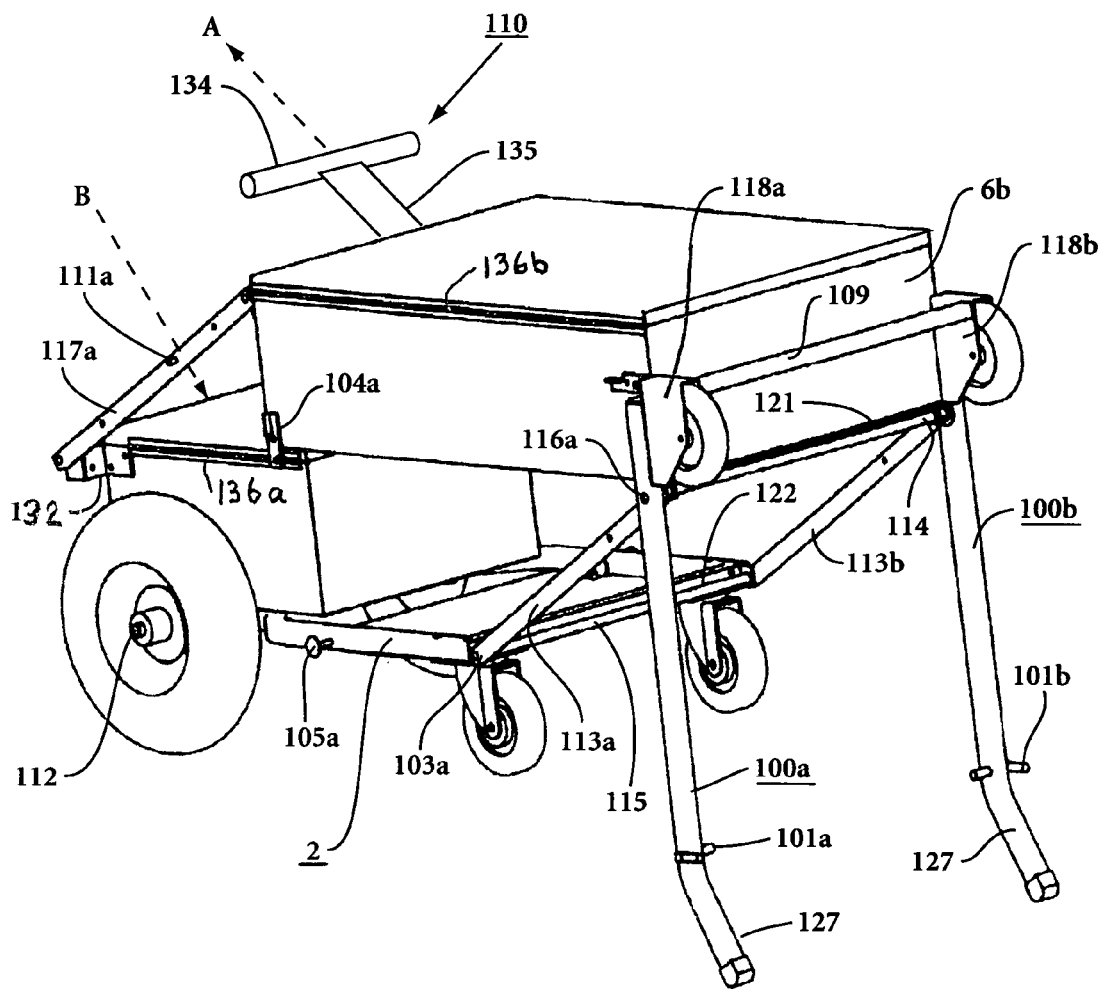
FIG. 24 is a side perspective view showing movement of the carrier toward its work bench mode.

Referring to FIGS. 22-26, articulating arms 113a, 113b pivotally connect the inner end portion 6d of structure 6 to the outer end portion 4d of structure 4. These end portions 6d, 4d are best seen in FIGS. 1-4. Wheelbarrow handles 100a, 100b with first ends 126 and second ends 127 are pivotally mounted at their second (top) ends 126 to the same pivot means that connects the arms 113e*a*, 113*b* to the second structure 6. Handles 100*a*, 100*b* are substantially longer than legs 21*a*, 21*b* which handles 100*a*, 100*b* replace. Articulating legs 117*a*, 117*b* as shown in FIGS. 24 and 27 replace legs 8*a*, 8*b* and pivotally mount between the top of end 6*d* of structure 6 and the corresponding top of end 4*d* of structure 4.

Figure 27:
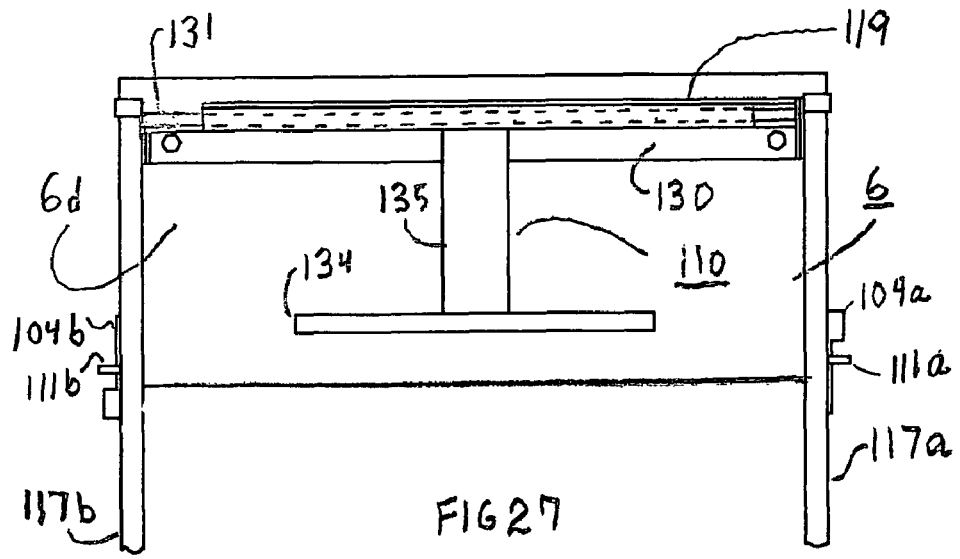
FIG. 27 is a front perspective view of the second receptacle showing a lift handle and upper pivoting arrangements connecting a first pair of articulating arms.
Figure 30:
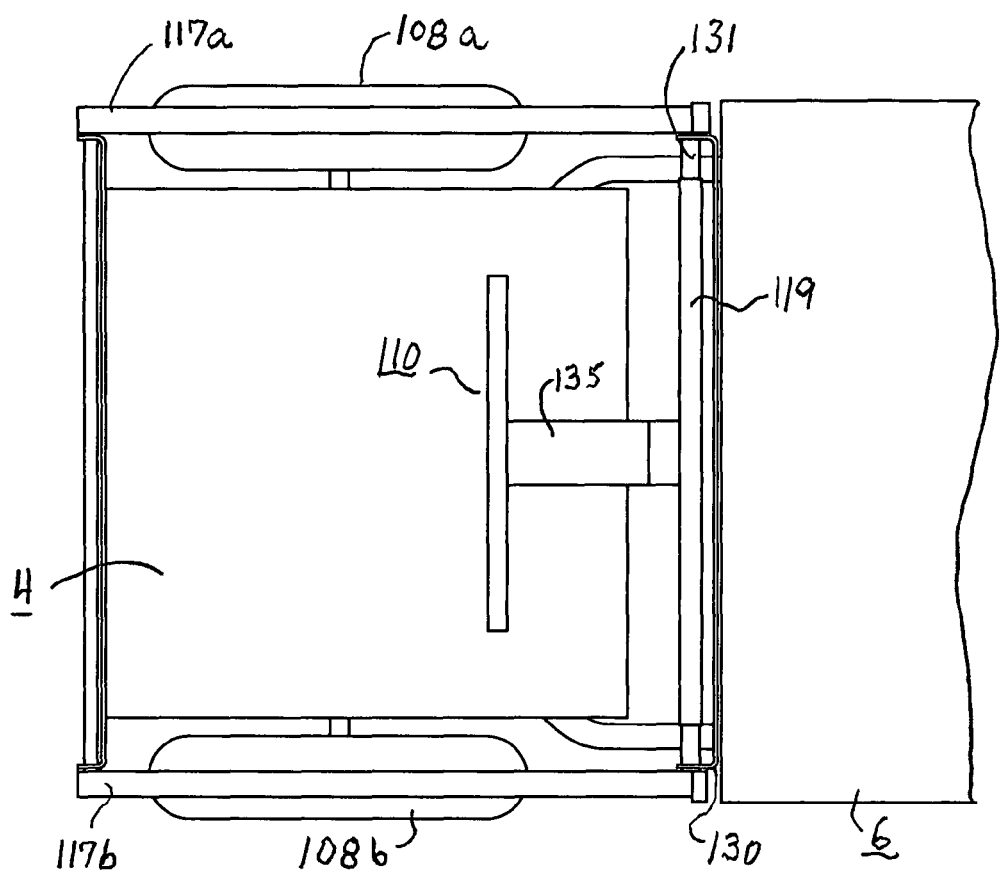
FIG. 30 is a partial top view of the carrier.

Referring to FIG. 27, bracket 130 mounted along the top of end 6*d* of structure 6 rotatably supports a pivot rod 131. Pivot rod 131 rigidly attaches to the upper ends of legs 117*a*, 117*b*, enabling legs 117*a, b* to pivot at their upper ends. Handle 110 is mounted on a tube 119 which fits over rod 131 and rotates freely thereon. Handle 110 has a grip 134 and a connector 135 fastening grip 134 to tube 119. Connector 135 is formed with an offset which is "s"-shaped as shown in FIG. 27. This S-shape is formed to enable handle 110 to lie essentially flat when resting on the top surface of structure 4 with carrier 1 in dolly mode, as seen in FIG. 30.

Figure 28:
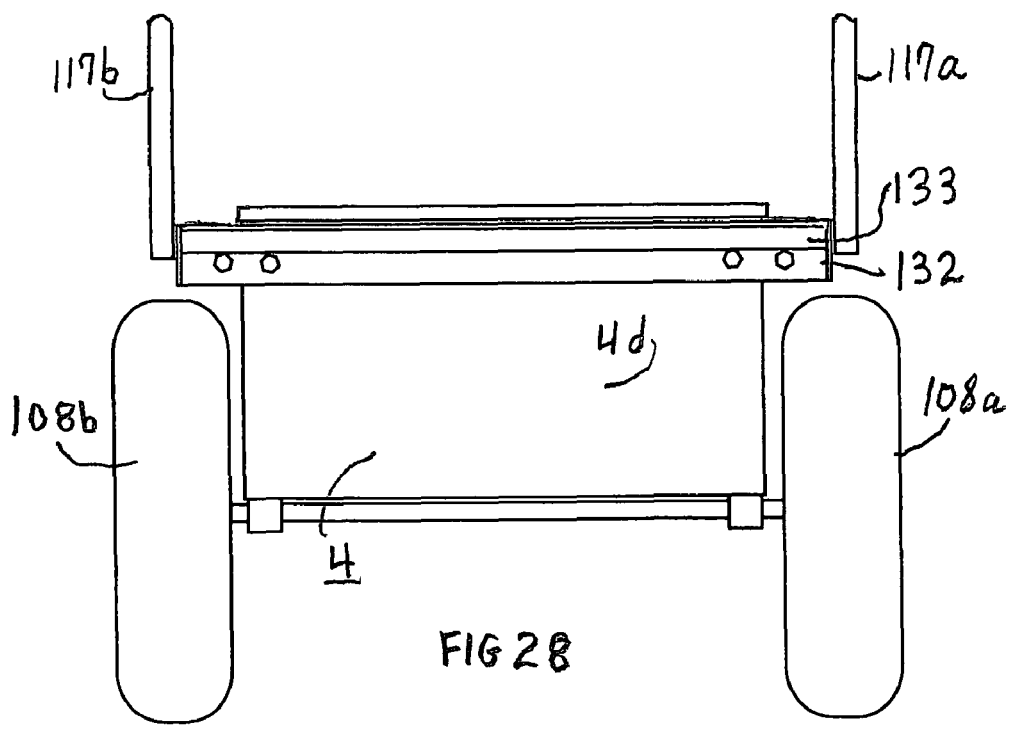
FIG. 28 front perspective view of the first receptacle slowing lower pivot mounting of a first articulating arm pair.

FIG. 28 shows a bracket 132 attached along the top of end 4*d* of structure 4. A pivot rod 133 rotating in bracket 132 rigidly joins the lower ends of legs 117*a*, 117*b*, enabling legs 117*a, b* to pivot at their lower ends A hand truck platform such as platform 25 shown in FIGS. 3 and 4 may be attached to the lower ends of articulating legs 117*a*, 117*b*.

As seen in FIGS. 22-26, two wheels 102*a*, 102*b* are fixed in housings 118*a*, 118*b*. The housings are connected to handles 100*a*, 100*b* at first handle ends 126. A grip 109 is mounted between wheel housings 118*a*, 118*b*. Wheels 102*a*, 102*b* assist in the loading and unloading of carrier 1 in the bed of a pickup truck in a manner similar to that illustrated in FIG. 19.

Figure 25A:
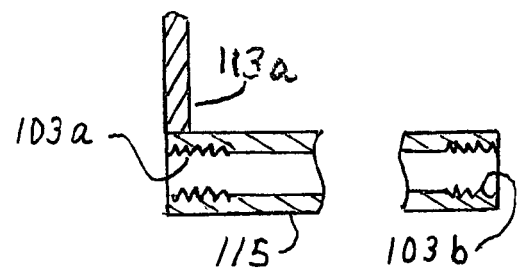
FIG. 25A is a sectional side view of a tubing and articulating arm pivot point showing internal threads.
Figure 25:
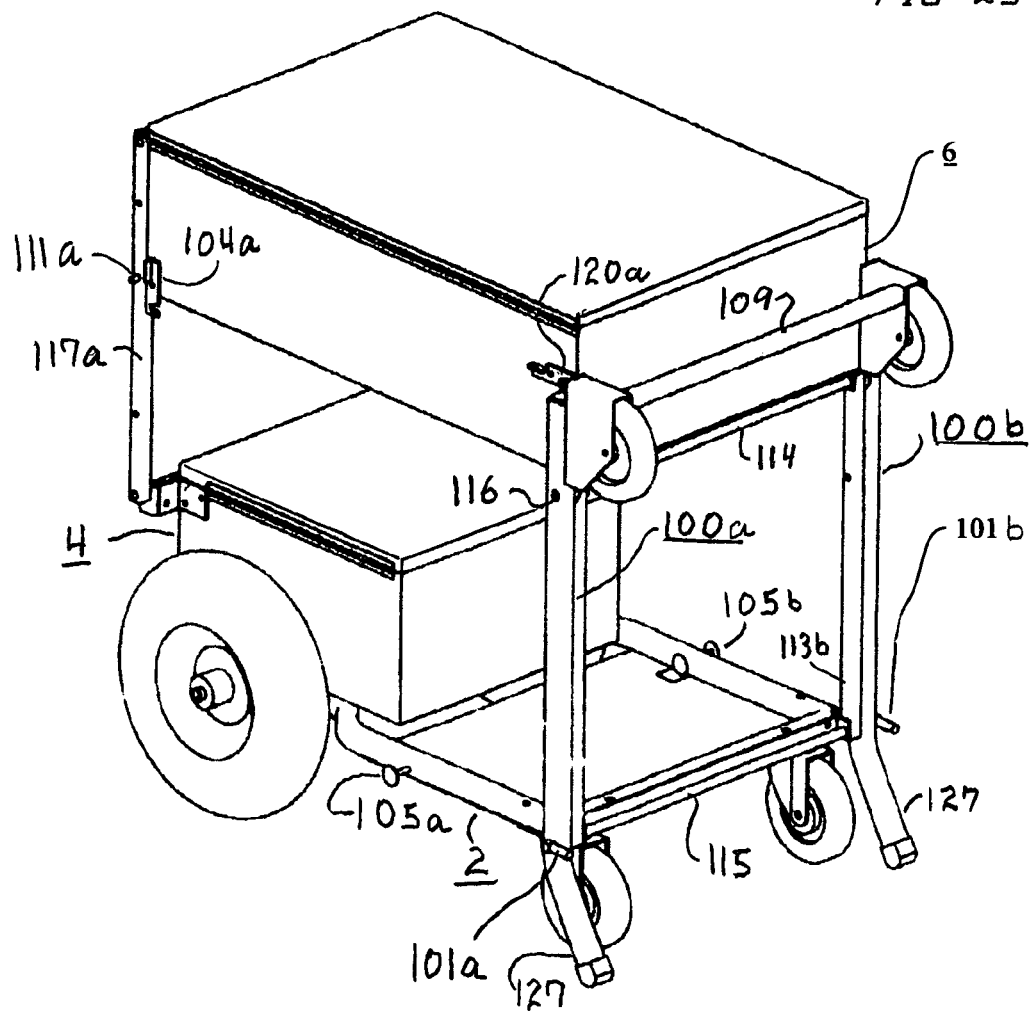
FIG. 25 shows a side perspective view of the carrier in work bench mode.
Figure 29:
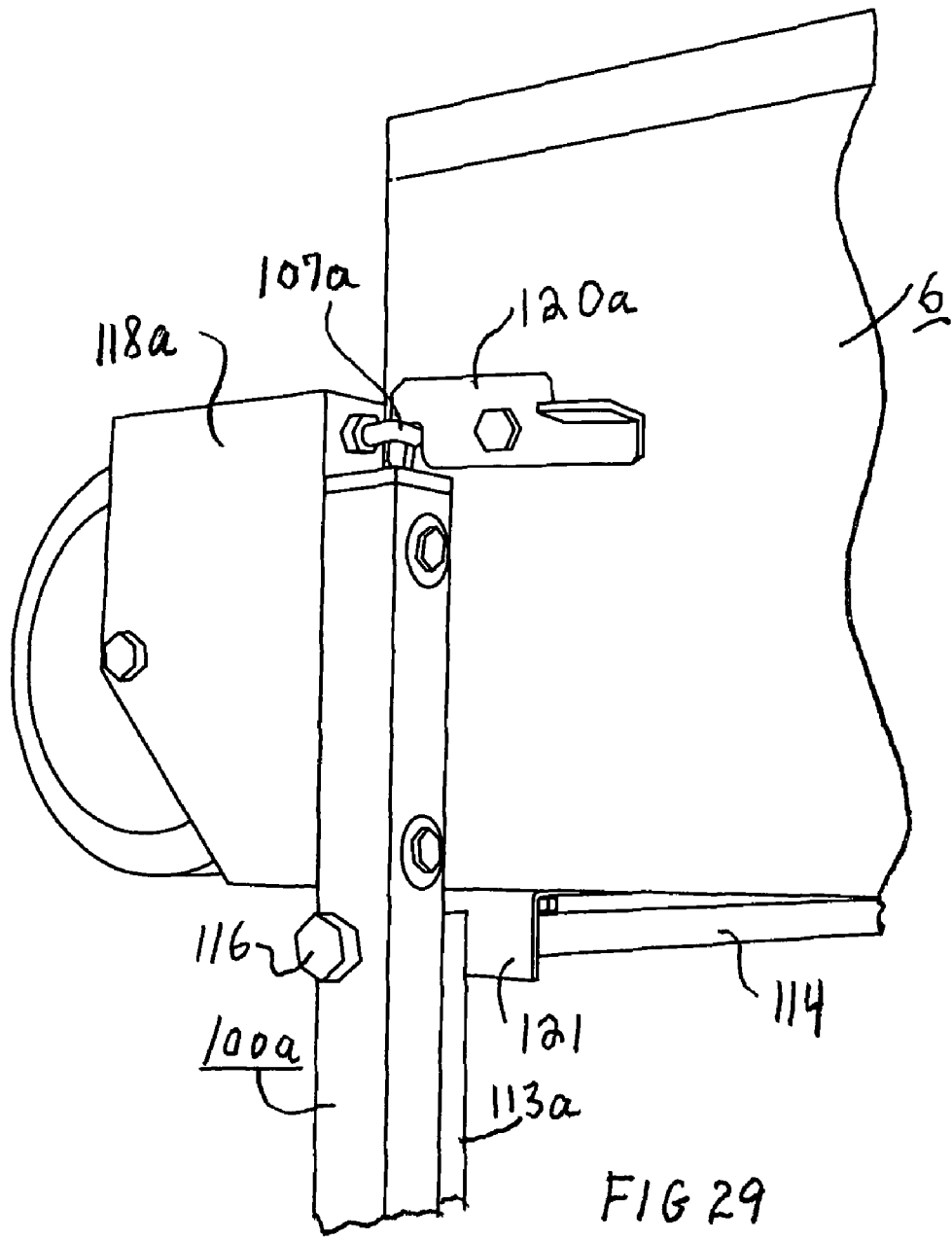
FIG. 29 is a perspective view of the second receptacle and common pivot arrangements for the handles and the upper ends of the second pair of articulating arms.
Figure 31:
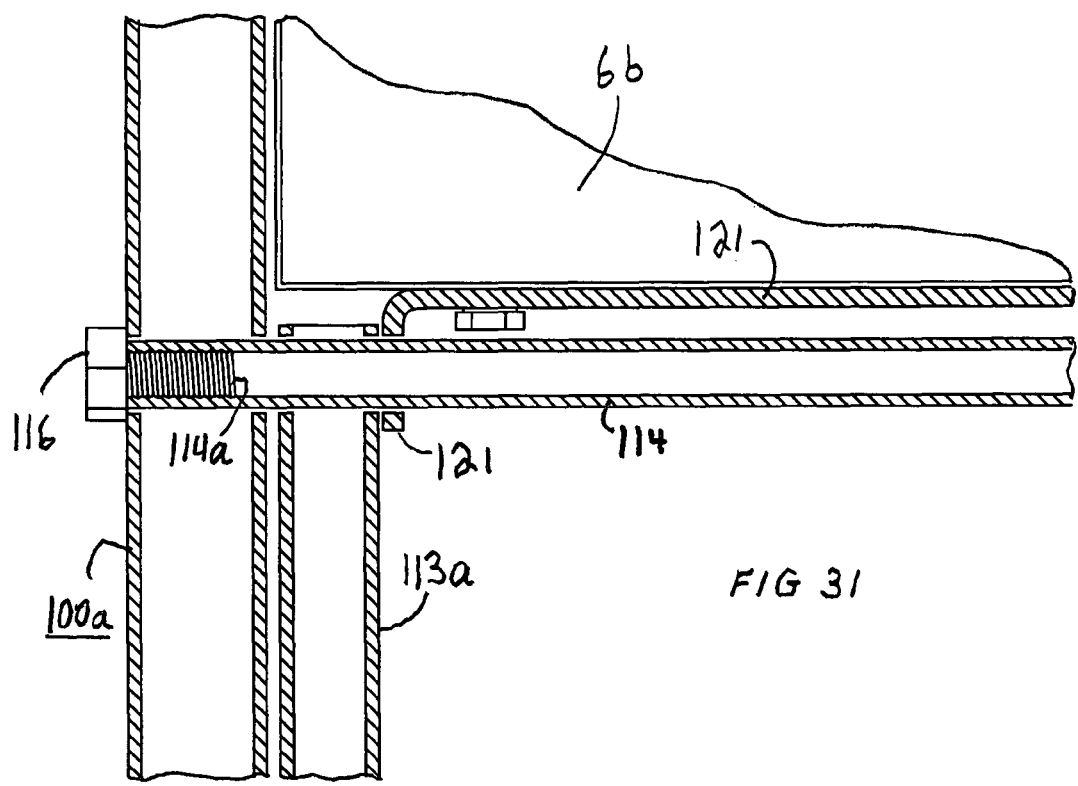
FIG. 31 is a sectional view through a pivot tubing for the handles and associated articulating arm.

As shown in FIG. 25. wheelbarrow handles 100*a*, 100*b* are substantially longer than articulating arms 113*a*, 113*b* with which they cooperate, thus to enable their angled bottom ends 127 to extend below arms 113*a*, 113*b* and into contact with a floor, Referring also to FIG. 31, handles 100*a*, 100*b* and arms 113*a*, 113*b* are rotatably mounted near their first (top) ends on the end portions 114*a* of tubing 114. Tubing 114 is held in a bracket 121 affixed to the underside of structure 6 along its outer end 6*b* as seen in FIGS. 24 and 29. The point of rotation of handles 100*a*, 100*b* on tubing 114 is located directly adjacent to the edges of wheel housings 118*a*, 118*b* as seen in FIG. 29. The length of tubing 114 and grip 109 are chosen so that, as illustrated in FIGS. 24-26 and 29, handles 100*a*, 100*b* pivot in a plane next to, or outboard of, the sides 6*a*, 6*c* of structure 6.

Thus, when handles 100*a*, 100*b* pivot from their position shown in FIG. 22, the wheels 102*a*, 102*b* and grip 109 also rotate until the housings 118*a*, 118*b* lodge against end 6*b* of structure 6 as seen in FIGS. 23, 24 and 29. Rotation to this position places the slightly angled second ends 127 of handles 100*a*, 100*b* in an outwardly-extending posture to better grip a floor. Rubber toes applied to ends 127 as shown in FIG. 23, further enhance the floor-gripping.

Referring to FIG. 24, tubing 115 is mounted on a bracket 122 extending from the end of chassis 2. The bottom ends of articulating arms 113*a*, 113*b* are connected to tubing 115. Tubing 115 has interior threads at ends 103*a*, 103*b* as seen in FIG. 25A, which receive threaded ends of L-bolts 101*a*, 101*b*. Thus as seen in FIG. 25, and detailed in FIG. 33, when L-bolts 101*a*, 101*b* are engaged to threaded ends 103*a*, 103*b* of tubing 115, the articulating arm 113*a* becomes integral with handle 100*a*; and likewise articulating arm 113*b* becomes integral with handle 100*b*. Having handles 100*a*, 100*b* so connected to arms 113*a*, 113*b* in the workbench mode greatly reduces any tendency of structure 6 to "wrack" or twist. With handles 100*a*, 100*b* secured in this position, the angled feet of the second (bottom) ends 127 of handles 100*a*, 100*b* act as a brake and support carrier 1 in a fixed workbench mode. In this mode swivel castors 106*a*, 106*b* mounted at the end of chassis 2 are slightly elevated above a floor on which carrier 1 is being used.

Figure 26:
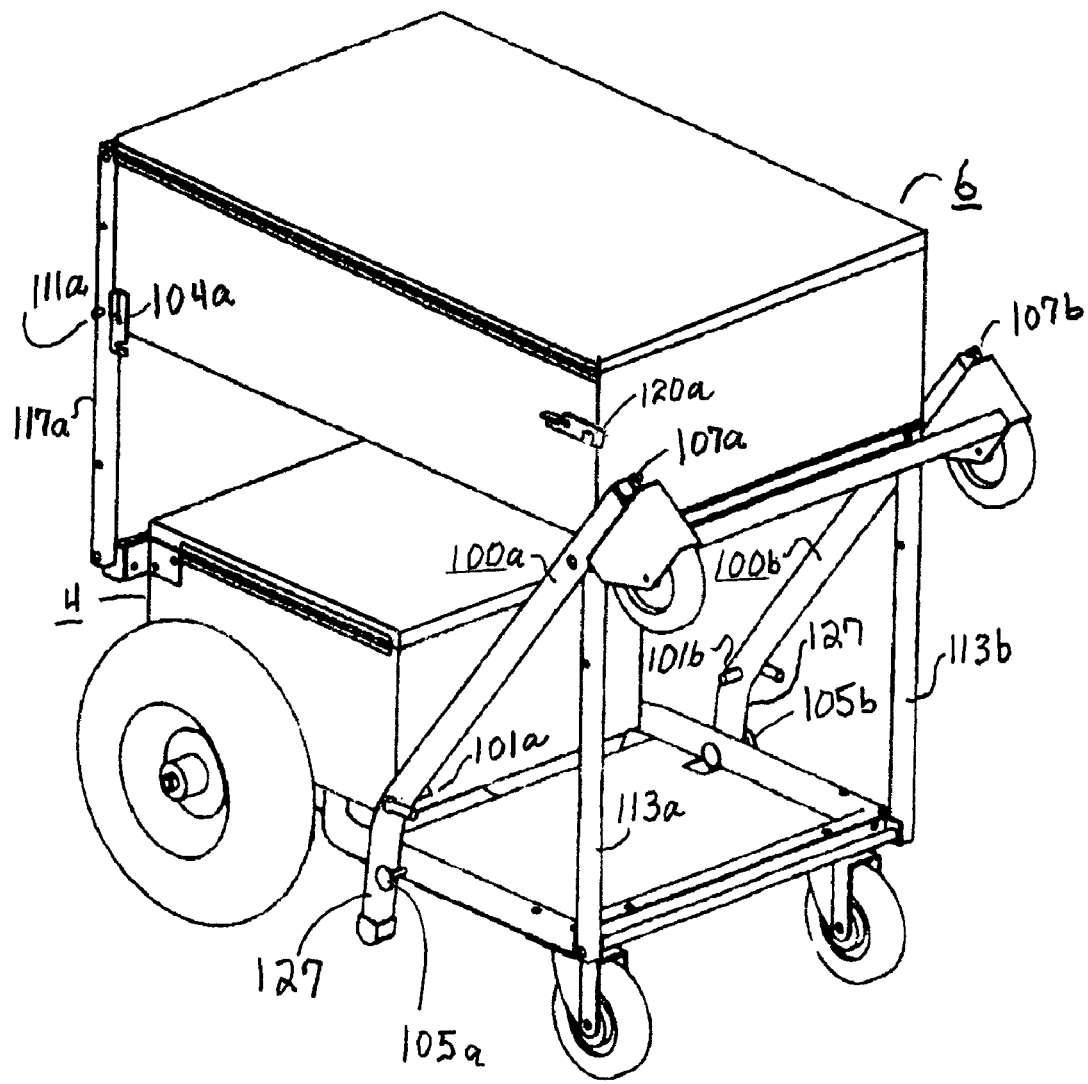
FIG. 26 is a side perspective view of the carrier with the handles released from locked position on the second receptacle and resting on the chassis.

By unscrewing L-bolts 101*a*, 101*b* to disengage them from tubing 115, and unlatching the latches 1'20*a*, 120*b* from pins 107*a*, 107*b*, wheelbarrow handles 100*a*, 100*b* become free to pivot rearward. This pivoting enables swivel castors 106*a*, 106*b* to lower to the floor or ground. To keep handles 100*a*, 100*b* out of the way while carrier 1 is being wheeled around, sliding pins 105*a*, and 105*b* fastened through the sides of chassis 2 are withdrawn to an extended position; and one or both handles 100*a*, 100*b* are rested atop pins 105*a*, 105*b* as shown in FIG. 26. In this mode, carrier 1 may be moved to another work location supported on castors 106*a*, 106*b* and pneumatic wheels 108*a*, 108*b*.

The use of carrier 1 in its various modes, made possible by wheelbarrow handles 100*a, b* and associated components, is next described.

Figure 34:
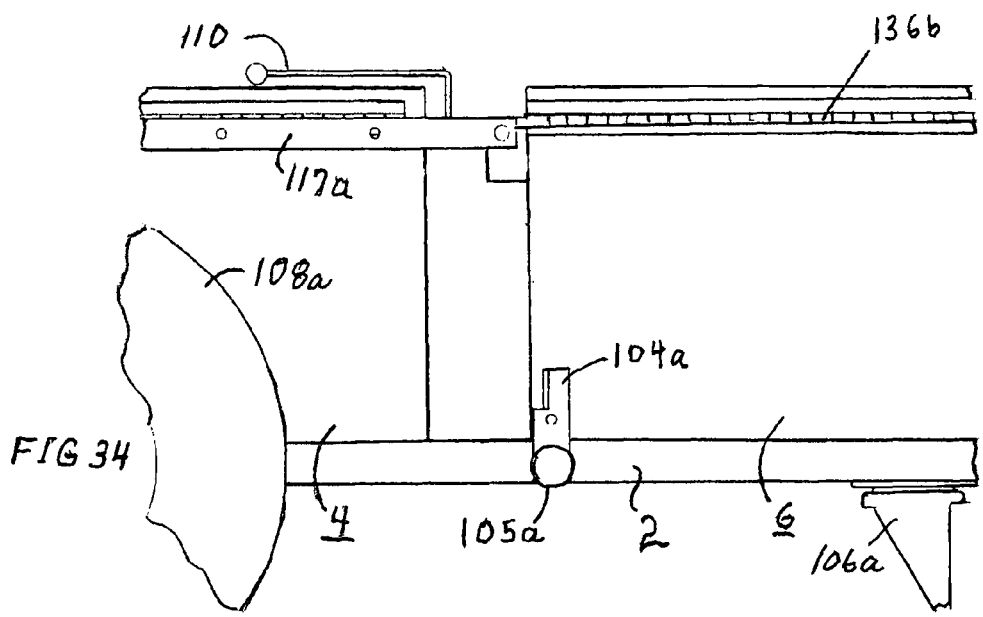
FIG. 34 is a side view showing the carrier latched in dolly mode.

Unloading from pick-up truck bed. In order to secure utility carrier 1 during transport, latches 104*a, b* are engaged onto pins 105*a*, 105*b* as shown in FIGS. 22 and 34. L-bolts 101*a*, 101*b* are tightened in the threads 103*a*, 103*b* of tubing 115. Carrier 1 is now locked into its 4-wheel dolly mode or 2-wheel hand truck mode, wherein the lower structure 4 and upper structure 6 are side-by-side and cannot move with respect to each other. When unloading carrier 1 from the bed of a pick-up truck, it is desirable to keep carrier 1 in this locked state and ease it off of the pick-up truck bed into its unload position shown in FIG. 19; and then into an upright vertical position where carrier 1 may be used as a hand truck.

Upright to semi-inclined. To transition from the upright or vertical position to the semi-inclined position shown in FIG. 23, L-bolts 101*a*, 101*b* are unscrewed and freed from threaded ends 103*a*, 103*b* of tubing 115, enabling handles 100*a*, 100*b* to freely rotate. While carrier 1 is still in it's vertical position, wheelbarrow handles 100*a*, 100*b* are rotated upwardly 90 degrees until the back sides of wheel housings 118*a*, 118*b* comes to a stop at side 6*b* of structure 6. Handles 100*a*, 100*b* now are locked against side 6*b* by engaging latches 120*a*, 120*b* to L-shaped pins 107*a*, 107*b* affixed to the housings 118*a*, 118*b*. The latching is illustrated best in FIG. 29. Carrier 1 is now in its "hand truck" mode. As the operator uses the hand truck mode, the leverage gained by handles 100*a*, 100*b* help place weight directly over pneumatic wheels 108*a*, 108*b* which allows easier load movement, easier turning, and easier movement up or down stairs or over rough terrain on construction sites.

From hand truck mode to stationary workbench. When the user wishes to convert carrier 1 to its workbench mode, the user lowers carrier 1 to rest the second ends 127 of handles 100*a*, 100*b* on the floor or ground. Carrier 1 is now supported on pneumatic wheels 108*a*, 108*b* and the second ends 127 of handles 100*a*, 100*b* in the position shown in FIG. 23. In contrast to the embodiment shown in FIGS. 1-4, the semi-inclined position illustrated in FIG. 23 made possible by handles 100*a*, 100*b* places one end of structure 6 close to the actual workbench height. In the semi-inclined position, the lower end of structure 6 is also partially elevated. Transitioning of carrier 1 from the semi-inclined position of FIG. 23 to the workbench position shown in FIG. 24 therefore requires substantially less lifting effort. In addition, as a result of creating the semi-inclined position of FIG. 23, dolly wheels 108*a*, 108*b* act as a facilitator for relatively easily moving the bulk of weight of carrier 1 vertically. Operation of this aspect of the invention is next described.

Figure 32:
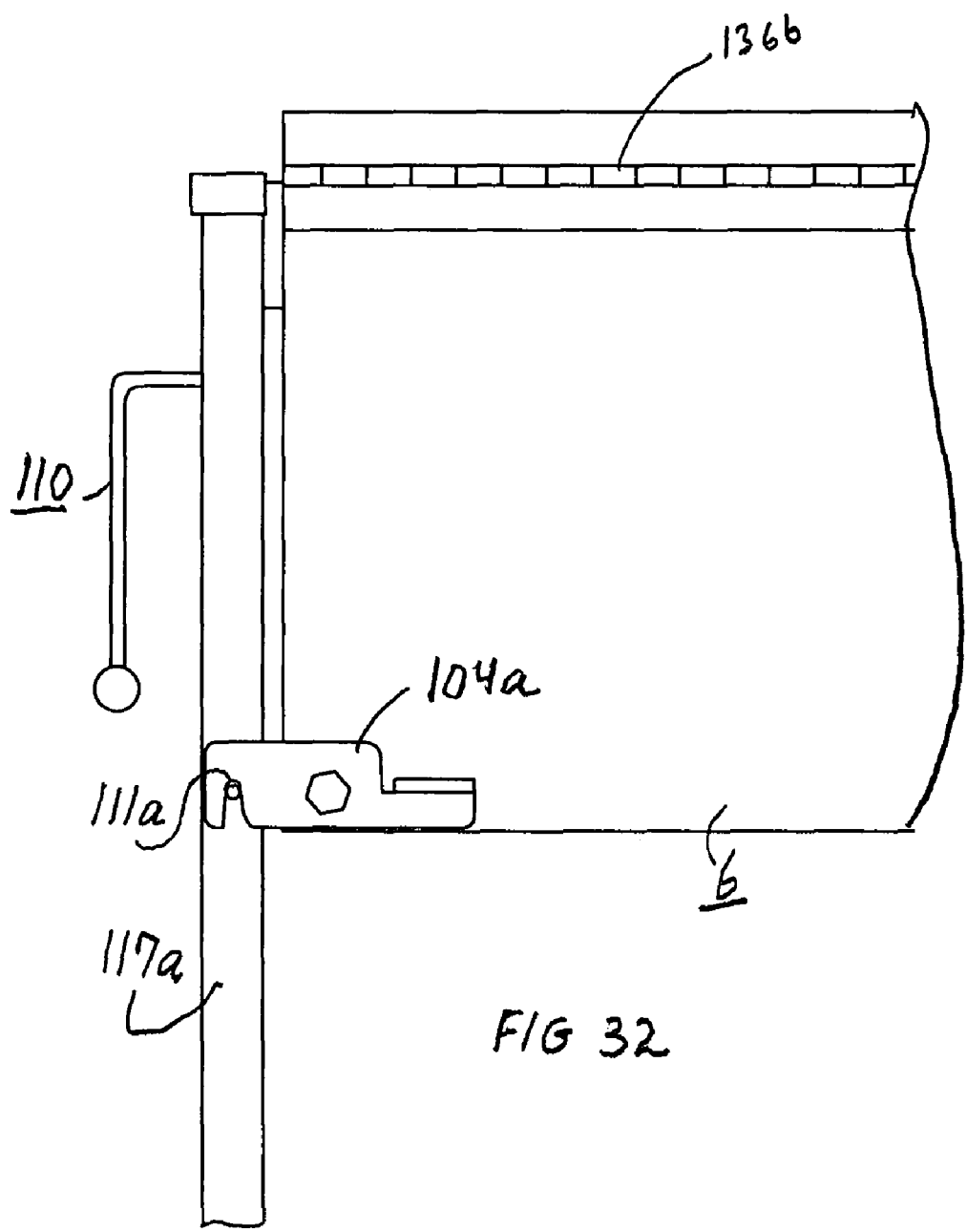
FIG. 32 is a side view showing one of the carrier articulating arms latched in workbench mode.

With carrier 1 still in its dolly or hand truck mode, the user releases latch 104*a* from pin 105*a* and latch 104*b* from pin 105*b*. This frees structure 6 to pivot with respect to structure 4. The user now stands behind wheels 108*a*, 108*b* and lifts on handle 110. Using handle 110 to stabilize his body, the user pushes on structure 4 with his foot/leg to create a force applied in the direction shown by vector "B" in FIG. 24 with hinges 136*a*, 136*b* positioning the work surfaces closed. At the same time the user lifts up on handle 110 in the direction shown by vector "A". As seen in FIG. 24, these actions commence a movement of wheels 108*a*, 108*b* and chassis 2 with its structure 4. The movement also causes a pivoting of articulating arms 113*a*, 113*b* and articulating arms 117*a*, 117*b* toward the vertical. During this operation, handle ends 127 act as brakes, keeping handles 100*a*, 100*b* stationary on the floor or ground. Structure 6 continues to elevate at its low end. At the completion of this movement structure 4 moves under structure 6 to the position shown in FIG. 25. The user now secures carrier 1 in the workbench mode by engaging latches 104*a*, 104*b* onto pins 111*a*, 111*b* as shown in FIG. 32.

Figure 33:
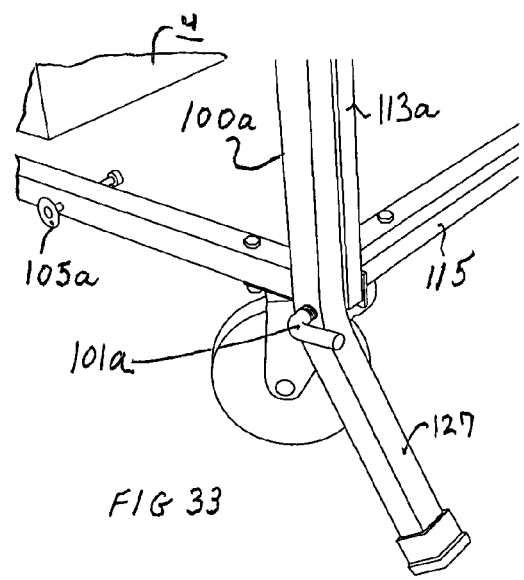
FIG. 33 is a perspective view showing the carrier handles secured in workbench mode.

The pivoting through the position shown in FIG. 24 to the workbench mode of FIG. 25 is surprisingly swift. As arms 113*a*, 113*b* and 117*a*, 117*b* approach the vertical, wheels 108*a*, 108*b* actually accelerate in their movement. As soon as articulating arms 113*a*, 113*b* are in alignment with handles 100*a*, 100*b*, latches 104*a* and 104*b* are engaged on pins 111*a*, 111*b* as shown in FIGS. 25 and 32. To fasten handles 100*a*, 100*b* back onto arms 113*a*, 113*b*, L-bolts 101*a*, 101*b* are again screwed into threaded ends 103*a*, 103*b* of tubing 115 as illustrated in FIGS. 25*a* and 33. This helps secures carrier 1 in its stationary workbench mode Handle ends 127 remain in contact with the floor or ground as they do in the semi-inclined position of FIG. 23 and continue to act as a brake, It is seen that latch 104*a*, 104*b* serve two latching purposes: engaging on pins 111*a*, 111*b* to help secure carrier 1 in its workbench mode as shown in FIGS. 25 and 32; and engaging on pins 105*a*, 105*b* to help secure carrier 1 in its hand truck or transport mode as shown in FIG. 22. It also should be appreciated that although the latching of latches 104*a*, and 104*b* to pins 105*a*, 105*b* and pins 111*a*, 111*b* is shown as being manual, the latching can be made automatic with use of conventional spring-loaded latches. Similarly, latching of latches 120*a*, 120*b* to pins 107*a*, 107*b* also can be self-operating.

Stationary workbench to mobile workbench. This conversion is accomplished by once again unscrewing L-bolts 101*a*, 101*b*, and disengaging latches 120*a*, 120*b* from pins 107*a*, 107*b*. Wheelbarrow handles 100*a*, 100*b* are again free to pivot. Standing behind carrier 1, the user pulls on handle 109, enabling carrier 1 to "rock" or pivot on ends 127 of handles 100*a*, 100*b* until swivel castors 106*a*, 106*b* lower to the ground or floor. Handles 100*a*, 100*b* may be placed out of the way by resting one or both on pins 105*a*, 105*b*. Carrier 1 may now be wheeled anywhere in the workplace that is reasonably level. If stairs or an incline must be negotiated, carrier 1 is placed in its hand truck mode as described above.

A substantial reduction in the tendency of structure 6 in its elevated position to twist due to wracking of articulating arms 113*a*, 113*b* and legs 117*a*, 117*b* is achieved in part by the series of latching and securing components described. These include: latches 104*a*, 104*b* engaged to pins 111*a*, 111*b*; latches 120*a*, 120*b* to pins 107*a*, 107*b*; and securing of L-bolts 101*a*, 101*b* to the ends of threaded tube 115. Wracking tendency also is reduced by the securing of handles 100*a*, 100*b* to arms 113*a*, 113*b*.

The invention is described in the claims to follow.

What is claimed is:

1. A work site utility carrier comprising:
    a first structure comprising a first top surface;
    a second structure comprising a second top surface;
    means for pivotally mounting said second structure in an elevated position above said first structure and for maintaining parallel relation at all times between said first and said second top surfaces;
        means for positioning said first and said second structures in a retracted position in which said first and said second top surfaces are substantially co-planar;
    a chassis for mounting said first structure at one end thereof
    first and second wheel sets mounted on said chassis for floor contact;
    a pair of leg extensions mounted on the exterior end of said second structure and extending downwardly beyond the bottom of said second structure;
    a third wheel set mounted on said leg extensions; and
    a handle grip mounted between said leg extensions;
    said third wheel set adapted to position on an elevated flat surface; and
    said handle grip enabling a user to lift said carrier onto said elevated flat surface.

2. The carrier in accordance with claim 1 wherein said pivotal mounting means comprises:
    a first pair of legs hinged from an end portion of said first structure to a corresponding end portion of said second structure;
    a second pair of legs hinged from a central portion of said chassis to a central portion of said second structure; and
    means for latching said first and second leg pairs when said second structure is in either its said elevated position or retracted position.

3. The carrier in accordance with claim 2, wherein each of said first and said second structures are 4-sided rectangular receptacles having a flat bottom and a planar open top surface.

4. The carrier in accordance with claim 3, further comprising:
    a hand-grip pivotally connected to an end of said second structure through which to apply upward force to said second structure for movement thereof from its said retracted to said elevated positions.

5. The carrier in accordance with claim 4, wherein said second receptacle further comprises one or more drawers and means for slidably mounting each said drawer within said second receptacle.

6. The carrier in accordance with claim 4, wherein said first receptacle further comprises a first flat closure for covering said first open top surface, and said second receptacle further comprises a second flat closure for covering said second open top surface.

7. The carrier in accordance with claim 6, wherein said latching means comprises means for releasably latching said second receptacle in its said retracted position and means for releasably latching said second receptacle in its said elevated position.

8. The carrier in accordance with claim 7, further comprising:
    means for powering the movement of the second structure in its vertical travel to reduce manual force needed to effect its movement back and forth between said retracted and said elevated positions.

9. The carrier in accordance with claim 8, wherein said first and said second flat closures each comprises a hinged 2-sided door, and each of said first and said second receptacles further comprises a lip extending around the interior area adjacent to said open top surface of said first and said second receptacles for supporting a respective 2-sided door.

10. The carrier in accordance with claim 9, wherein said first wheel set comprises a pair of pneumatic tires, and said carrier further comprises releasable breaking means for preventing and enabling rotation of said pneumatic tires.

11. The carrier in accordance with claim 10, wherein said second wheel set comprises a pair of castor wheels, said first and second wheel sets enabling movement of said carrier as a dolly.

12. The carrier in accordance with claim 11, wherein said second structure further comprises means for hinging said leg extensions between a downwardly-facing position and an upwardly extending position, enabling a user to manually move said carrier on a surface using said hand grip.

13. A work site utility carrier comprising a dolly mode and a hand truck mode, said carrier comprising:
   a first rectilinear box structure comprising
      a planar first top;
      inner and outer end portions;
   a second rectilinear box structure comprising
      a planar second top;
      inner and outer end portions;
      a retracted position and a fully elevated position;
   a chassis having
      a first end and a second end;
      first and second wheel sets mounted under said chassis for floor contact;
   means for fixedly mounting said first rectilinear box structure on said first end of said chassis;
   means for pivot mounting said second rectilinear box structure to said carrier, said pivot mounting means comprising:
      first and second articulating arms,
      first pivot means connecting a first end of each said arm to opposite sides of said second end of said chassis,
      second pivot means connecting a second end of each said arm outboard of said outer end portion of said second rectilinear box structure;
      first and second articulating legs,
      third means for pivotally connecting each said articulating leg at a first end to opposite sides of said inner end portion of said second rectilinear box structure;
      fourth means for pivotally connecting each said articulating leg at a second end to said outer end portion of said first rectilinear box structure;
      said pivot mounting means positioning said first and said second rectilinear box structures in a said retracted position in which said planar first top and said planar second top are substantially co-planar;
      and said pivot mounting means placing said second rectilinear box structure above said first rectilinear box structure when said second rectilinear box structure is in a said full elevated position; and
      said pivot mounting means maintaining parallel relation between said first and said second planar tops in intermediate pivot positions between said retracted position and said full elevated position.

14. Apparatus in accordance with claim 13, further comprising:
   first and second wheelbarrow handles;
      each said handle located outboard of a respective one of said articulating arms and each said handle pivotally mounted to said second pivot means that pivotally mounts said second end of each said articulating arm;
      each said handle further comprising angled end portions for floor and ground contact;
      the length of each said wheelbarrow handle with its said angled end portion being sufficiently longer than said associated articulating arms such that when said first rectilinear box structure is in its said full elevated position said second wheel set of said chassis is raised out of said floor contact.

15. Apparatus in accordance with claim 14 wherein said second pivot means comprises:
   an elongate tube disposed along a lower outer edge of said second rectilinear box structure and extending outwardly thereof at each end;
   said first and said second articulating arms being rotatably mounted to said tube adjacent to respective sides of said second rectilinear box structure;
   said first and second wheelbarrow handles being rotatably mounted on said tube outboard of respective said first and said second articulating arms.

16. Apparatus in accordance with claim 15, further comprising:
   means for engaging said first and said second wheel barrow handles to said first and second articulating arms when said handles and said arms are adjacent to one another with said second rectilinear box structure in its said full elevated position.

17. Apparatus in accordance with claim 16, wherein said engaging means comprises:
   interior threaded end portions of said tube;
   first and second L-shaped bolts;
   said bolts fastening to respective said interior threaded end portions thereby to secure said handles and said articulating arms in place when adjacent to one another.

18. Apparatus in accordance with claim 17, further comprising:
   means for locking said first rectilinear box structure to said second rectilinear box structure when said structures are adjacent to one another in said dolly or hand truck mode of said carrier.

* * * * *